United States Patent
Zhao et al.

(10) Patent No.: US 11,761,427 B2
(45) Date of Patent: Sep. 19, 2023

(54) METHOD AND SYSTEM FOR BUILDING PRESCRIPTIVE ANALYTICS TO PREVENT WIND TURBINE FAILURES

(71) Applicant: AspenTech Corporation, Bedford, MA (US)

(72) Inventors: Hong Zhao, Sugar Land, TX (US); Ashok Rao, Sugar Land, TX (US); Gaurav Rai, Billierca, MA (US); Mir Khan, Katy, TX (US); Pedro Alejandro Castillo Castillo, Houston, TX (US); Magiel J. Harmse, Houston, TX (US)

(73) Assignee: ASPENTECH CORPORATION, Bedford, MA (US)

( * ) Notice: Subject to any disclaimer, the term of this patent is extended or adjusted under 35 U.S.C. 154(b) by 30 days.

(21) Appl. No.: 17/362,681

(22) Filed: Jun. 29, 2021

(65) Prior Publication Data

US 2022/0412318 A1  Dec. 29, 2022

(51) Int. Cl.
*F03D 17/00* (2016.01)
*G08B 21/18* (2006.01)

(52) U.S. Cl.
CPC .............. *F03D 17/00* (2016.05); *G08B 21/18* (2013.01); *F05B 2260/80* (2013.01); *F05B 2260/84* (2013.01)

(58) Field of Classification Search
CPC .... F03D 17/00; F03D 7/0224; F05B 2260/80; F05B 2260/84; F05B 2270/337; F05B 2270/331; G08B 21/18
See application file for complete search history.

(56) References Cited

U.S. PATENT DOCUMENTS 8,277,183 B2    10/2012  Qu
8,326,577 B2 *  12/2012  Graham, III ....... G05B 23/0237
                                                          702/181
(Continued)

FOREIGN PATENT DOCUMENTS

CN    106991508 A    7/2017
CN    110533314 A    12/2019
(Continued)

OTHER PUBLICATIONS

Liang, Tao et al., "SOM-MQE and SFCM-based wind generator health state online monitoring and fault diagnosis method", Jul. 24, 2019, CNIPA, 1-8 (Year: 2019).*

(Continued)

*Primary Examiner* — Sabbir Hasan
*Assistant Examiner* — Joshua R Beebe
(74) *Attorney, Agent, or Firm* — Hamilton, Brook, Smith & Reynolds, P.C.

(57) ABSTRACT

Systems and methods for building predictive and prescriptive analytics of wind turbines generate a historical operational dataset by loading historical operational SCADA data of one or more wind turbines. Each sensor measurement is associated with an engineering tag and at least one component of a wind turbine. The system creates one or more performance indicators corresponding to one or more sensor measurements, and applies at least one data clustering algorithm onto the dataset to identify and label normal operation data clusters. The system builds a normal operation model using normal operational data clusters with Efficiency of Wind-To-Power (EWTP) and defines a statistical confidence range around the normal operation model as criterion for monitoring wind turbine performance. As real-time SCADA data is received by the system, the system can detect an anomalous event, and issue an alert notification (Continued)

and prescriptive early-action recommendations to a user, such as a turbine operator, technician or manager.

28 Claims, 20 Drawing Sheets
(7 of 20 Drawing Sheet(s) Filed in Color)

(56) References Cited

U.S. PATENT DOCUMENTS

| | | | |
|---|---|---|---|
| 10,041,475 B1* | 8/2018 | Badrinath Krishna | ........................ F03D 7/047 |
| 10,288,043 B2 | 5/2019 | Yu et al. | |
| 2014/0067377 A1* | 3/2014 | Reiter | ................. G06F 40/56 704/9 |
| 2018/0320658 A1* | 11/2018 | Herzog | ................. F03D 7/045 |
| 2020/0049129 A1* | 2/2020 | Girardot | ............... G05B 19/042 |
| 2020/0141393 A1* | 5/2020 | Yu | ............................ F03D 17/00 |
| 2020/0210824 A1 | 7/2020 | Poomaki et al. | |
| 2022/0302705 A1* | 9/2022 | Zhang | ................. G05B 13/0265 |

FOREIGN PATENT DOCUMENTS

| | | | | |
|---|---|---|---|---|
| CN | 112727702 A | 4/2021 | | |
| WO | WO-2017174084 A1 * | 10/2017 | ............. | F03D 17/00 |
| WO | 2019152559 A1 | 8/2019 | | |
| WO | 2023/278942 A1 | 1/2023 | | |

OTHER PUBLICATIONS

Liang, Zhiping, "The Wind Power Forecasting Modelling of Data Screening Method, Device, and Wind Generating Set", Dec. 1, 2017, CNIPA, 1-9 (Year: 2017).*

Carrillo, C. et al., "Review of power curve modelling for wind turbines," Renewable and Sustainable Energy Reviews, 21: 572-581 (2013).

Global Wind Energy Council (GWEC), "Global Wind Statistics 2015, 10.2.2016," 4 pages.

Gottschall, J. et al., "How to improve the estmation of power curves for wind turbines," Environ. Res. Lett., 3: 015005, 7 pages (2008).

Jin, T. et al., "Uncertainty Analysis for Wind Energy Production with Dynamic Power Curves," PMAPS 2010, 2010 IEEE, pp. 745-750.

Lydia, M. et al., "A comprehensive review on wind turbine power curve modeling techniques," Renewable and Sustainable Energy Reviews, 30: 452-460 (2014).

Lydia, M. et al., "Advanced Alogorithms for Wind Turbine Power Curve Modeling," IEEE Transactions on Sustainable Energy, vol. 4, No. 3: 827-835 (Jul. 2013).

North American Wind Power, "Predicting Sudden Changes in Wind Power Generation," 3 pages (Oct. 2008).

Pattabiraman, T.R. et al., "Assessment of sideband energy ratio technique in detection of wind turbine gear defects," Case Studies in Mechanical Systems and Signal Processing, 2: 1-11 (2015).

Raj, M.S.M. et al., "Modeling of Wind Turbine Power Curve," 2011 IEEE PES Innovative Smart Grid Technologies—India, 5 pages (2011).

Stetco, A. et al., "Machine learning methods for wind turbine condition monitoring: A review," Renewable Energy, 133: 620-635 (2019).

Tautz-Weinert, J. et al., "Using SCADA data for wind turbine condition monitoring—a review," IET Renewable Power Generation, Special Issue: Wind Turbine Condition Monitoring, Diagnosis and Prognosis, vol. 11, No. 4: 382-394 (2017).

International Search Report and Written Opinion of PCT/US2022/072973 dated Sep. 27, 2022.

* cited by examiner

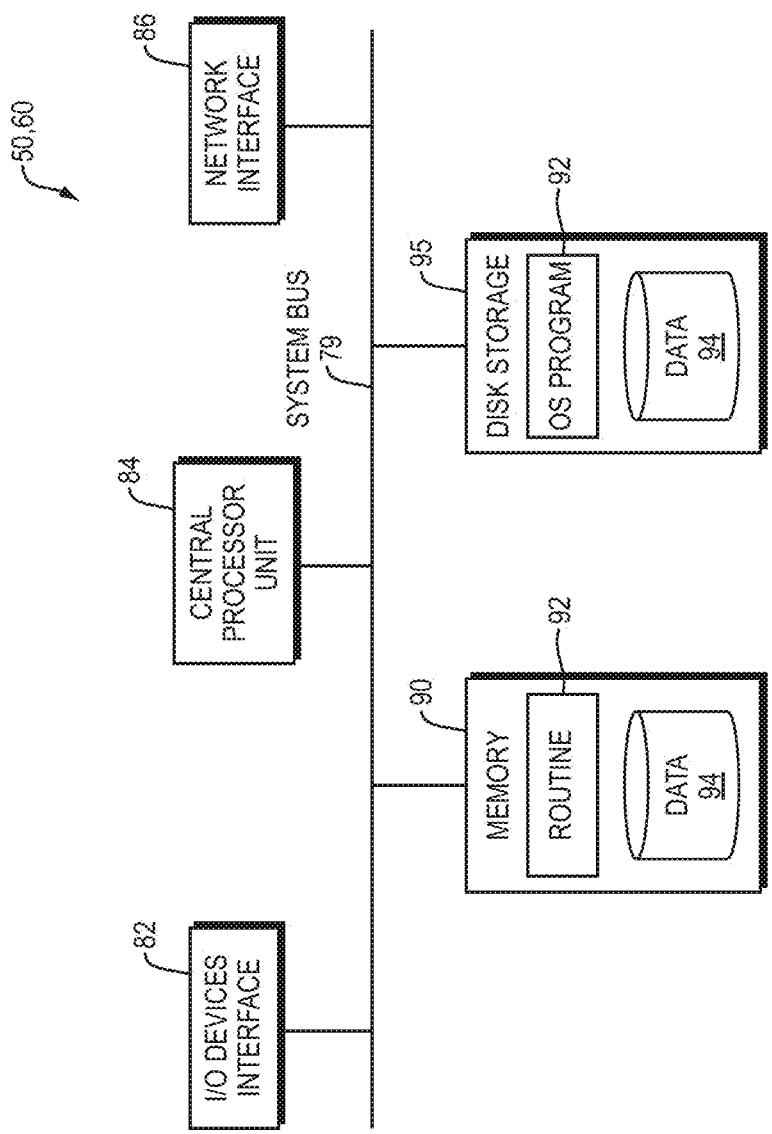

METHOD AND SYSTEM FOR BUILDING PRESCRIPTIVE ANALYTICS TO PREVENT WIND TURBINE FAILURES

BACKGROUND

Environmental concerns and a limited supply of fossil fuels have caused great attention and efforts to renewable energy. Wind energy is expanding at the fastest rate among all alternative forms of energy generation. However, the large-scale deployment of wind energy has also brought challenges to performance assessment of wind turbines, and their sustained performance as well. A turbine with deteriorating performance may be prone to failures, including catastrophic ones. An accurate and timely detection of an operational anomaly around a mechanical or electrical component may issue early warnings that enables early maintenance intervention such as maintenance up-towers rather than large repairs in shop floor with significant increase in cost as well as energy loss. In particular, the ever-increasing size of wind turbines and the trend to install them offshore have accelerated the need for optimized maintenance strategies in order to reduce the total operating costs.

SUMMARY

Traditional preventive maintenance strategies involving periodic checkups are expensive and inefficient in prevention of catastrophic failures. In industrial practice, predictive maintenance of wind turbines usually requires detailed information on the condition of turbines. Due to the high costs of dedicated condition monitoring systems, the use of data from the turbine supervisory control and data acquisition (SCADA) system is appealing. The SCADA data are collected from multiple online sensors to measure operational conditions (e.g. temperature, pressure, and rpms etc.) and are readily available and sampled at a relatively low-cost rate (e.g. 10 minutes per sample). In a wind farm, historical SCADA dataset recorded from each wind turbine's history of operation are available for individual wind turbine performance monitoring, analysis and failure prediction, a system and method that enables efficient use of SCADA data to model and predict wind turbine failures, with or without vibration measurements (if available), will be desirable and significantly beneficial to the renewable energy industry.

There have been research papers and case studies published on wind turbine monitoring and failure detection. However, these studies focus on building a wind turbine performance model, such as the well-known as "Power-Curve" by either theoretical aerodynamic analysis or a data-driven approach (e.g. regression with polynomial approximation, neural networks, and such). Some of the research focuses on a special condition or failures, such as specific gearbox failures, while others tried different Machine-Learning (ML) algorithms and tested one or more Artificial Intelligence (AI)/ML models. Embodiments consistent with principles of the invention provide a more systematic solution.

Recent advances in Artificial Intelligence (AI), specifically Machine Learning (ML) provide new capabilities to address the maintenance issue by applying AI/ML techniques to develop predictive and prescriptive analytics for wind turbines and wind farms. For example, a system with embedded AI/ML techniques may facilitate industrial practitioners to build and validate analytic models with historical SCADA data and then deploy the analytic models online to serve for wind turbine real-time monitoring, automatic anomaly detection, diagnosis analysis, early failure predictions and prevention of breakdowns.

However, the use of historical SCADA data for modeling wind turbines presents challenging problems. Typical SCADA data contains various bad data segments, includes missing values, various values as "outliers" due to environment conditions, for example, extreme weather, overloaded turbine with persist high wind speed, imbalanced blades due to icing or insects and such. Those outlier values cannot represent the normal operation of a wind turbine and therefore must be identified and labeled. Data view and selection are heavy burdens on already in-shortage wind farm engineers and operators, it will be impossible for them to identify and label data manually over many years of SCADA data for multiple wind turbines.

Embodiments consistent with principles of the invention provide systems and methods for building predictive and prescriptive analytics of wind turbines. These systems and methods generate a historical operational dataset by loading historical operational SCADA data of one or more wind turbines. These systems may include a data loading and pre-processing sub-system to load and transform historical operation sensor data, such as the data collected from the turbine SCADA system. As mentioned above, the historical operational SCADA dataset contains a number of sensor measurements collected over time. Each SCADA dataset may contain tens to hundreds of time series of senor measurements collected from one or more wind turbines. Each sensor measurement is associated with an engineering tag and at least one component of a wind turbine. The system creates one or more performance indicators corresponding to one or more sensor measurements, and applies at least one data clustering algorithm onto the dataset to identify and label normal operation data clusters. The system builds a normal operation model using normal operation data clusters with an indicator, the Efficiency of Wind-To-Power (EWTP) ratio. The system defines a statistical confidence range around the normal operation model as criterion for monitoring wind turbine performance. As real-time SCADA data is received by the system, the system can detect an anomalous event from the real-time SCADA data based on measurements of the real-time SCADA data relative to the statistical confidence range, and issue an alert notification and prescriptive early-action recommendations to a user, such as a turbine operator, technician or manager. In some embodiments, defining the statistical confidence range around the normal operation model includes calculating 3-sigma upper and lower envelope boundaries around the normal operation model. In some embodiments, the anomalous event may be identified by matching a detected anomalous event to one or more classes of previous known anomalous events. In particular, these events may include specific operational, mechanical or electrical failures. Further, the system may find corresponding action recommendations from previous recordings, working logs, and failure remediation in order to provide appropriate notifications.

In some embodiments, the system may also load and use data measured with high frequency-sampling from dedicated condition monitoring systems (CMS), such as vibration measurements if they are available. In yet other embodiments, the system may load and use metadata, for example, operational logs, repair records, and orders of equipment and parts.

In embodiments consistent with principles of the invention, the data clustering algorithm can be one of Density- Based Spatial Clustering of Applications with Noise (DB-SCAN), Local Outlier Factor (LOF) clustering, or K-Means clustering.

In yet additional embodiments, one performance indicator is Efficiency of Wind-To-Power (EWTP), which is defined as the ratio of output (electrical) power produced from a wind turbine to the wind speed feeding into the wind turbine.

In other embodiments, applying at least on data clustering algorithm includes identifying the normal operation data cluster from the highest density of data clusters and generating a normal operation dataset. Furthermore, it may include splitting the normal operation data clusters into two sub-datasets according to the wind speed measurement values. In building a normal operation model, some embodiments calculate regressions of two separate linearized models of training data covering two operation ranges. Where the normal operation dataset is split into two sub-datasets, in some embodiments each normal operation sub-datasets may be partitioned with a selected ratio (e.g. 70:30 random samples), one portion setting for model training, and the other portion for model testing.

Embodiments consistent principles of the invention may assess the severity of the identified anomalies or pre-failures with estimations of current stage as well as model predictions on a foresight failure. In yet other embodiments, when an identified anomaly is detected, the system may adapt the operation of the wind turbine to minimize the risk of wind turbine failure when an identified anomaly is detected. In embodiments consistent with principles of the invention, the system will adapt a normal operation model with next received data if the model is degraded or transferred to another wind turbine. To adapt the normal operation model, embodiments may periodically monitor the real-time SCADA data to analyze wind turbine operation performance; and update the normal operation model based on the analysis of the wind turbine operation performance.

Other embodiments may further include creating, from the received SCADA data, a working dataset; the working dataset creation being automatically performed by the one or more processors. Additionally, in some embodiments, the created working dataset may also include (i) processing the received includes at least one of identifying bad data segments, such as missing values or "NaN" and repairing some of the bad data segments with estimates, and preprocessing the dataset for later use; (ii) aligning data over time against a reference target sensor measurement in an automated manner by performing a dynamic correlation analysis among all process variables of the subject wind turbine; (iii) identifying the peak values of correlation coefficients between each variable and the target variable; and (iv) shifting the data measurements data against a target variable, based on the identified maximum correlation peak values at which the time-shifted between two sensor variables. The created working dataset may include and be stored as a generated dataset.

Other embodiments consistent with principles of the invention further comprise labeling and separating the generated and stored dataset with a highly efficient unsupervised AI data clustering algorithm, which facilitates identification and data selections of a wind turbine's normal operation data vs. anomalous data. Using the labeled and selected normal operation data, embodiments may build a simplified aerodynamic model and then deploy it online, which enables an online performance monitoring of individual wind turbine, where any significant operational event or machine performance degradation associated with a wind turbine can be detected and an alert associated with the wind turbine can be generated.

The simplified aerodynamic model may further include applying different AI feature engineering to two operational zones based on the domain knowledge and achieved full coverage of wind turbine performance data. In some embodiments, the system builds aerodynamic models for multiple turbines with a same model structure, also known as transferable learning, where each model remains the key "aerodynamic" principle features while the model contains fewer paraments that made it easily adaptive to environmental or internal operation conditions change.

Yet additional embodiments further allow users to test and validate the simplified aerodynamic model with a turbine's historical operational SCADA data before deployment; an optional fine-tuning can be performed to achieve optimal model fitting. Systems may further deploy a validated aerodynamic model online for real-time wind turbine performance monitoring; a key performance indicator (KPI) is defined and online monitored with an alarm threshold based on statistics, for example, using a 2-sigma/3-sigma rule for 95% and 99% confidence individually.

Other embodiments may further include model adaptation when the system detects that a built and deployed normal operation model no longer represents well a wind turbine's performance due to variations such as environmental conditions and machine parts replacement. The system may automatically adapt the deployed model to improve its accuracy for monitoring and prediction.

In addition to an overall model for monitoring and assessing wind turbine's performance, additional embodiments may further include using the labeled/selected normal operational data to build at least one sub-model(s) to monitor specific mechanical or electrical compartment; each such sub-model uses one or more features to generate a baseline and then online calculate the same feature(s) continuously; while a significant deviation for the calculated feature(s) is observed or detected online, the system may issue a warning alert through a user interface (UI) or sending out an alert email message, depending on the system configuration.

The built monitoring agent system is highly transferable due to the similarity among neighborhood wind turbines, therefore the efforts and cost required can be reduced significantly. Applying to historical wind turbine SCADA from wind farm, application examples demonstrate the capability and effectiveness of the system and method.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 6 is a block diagram of a computer node in the network of FIG. 5

DETAILED DESCRIPTION

A description of example embodiments follows.

Figure 1A:
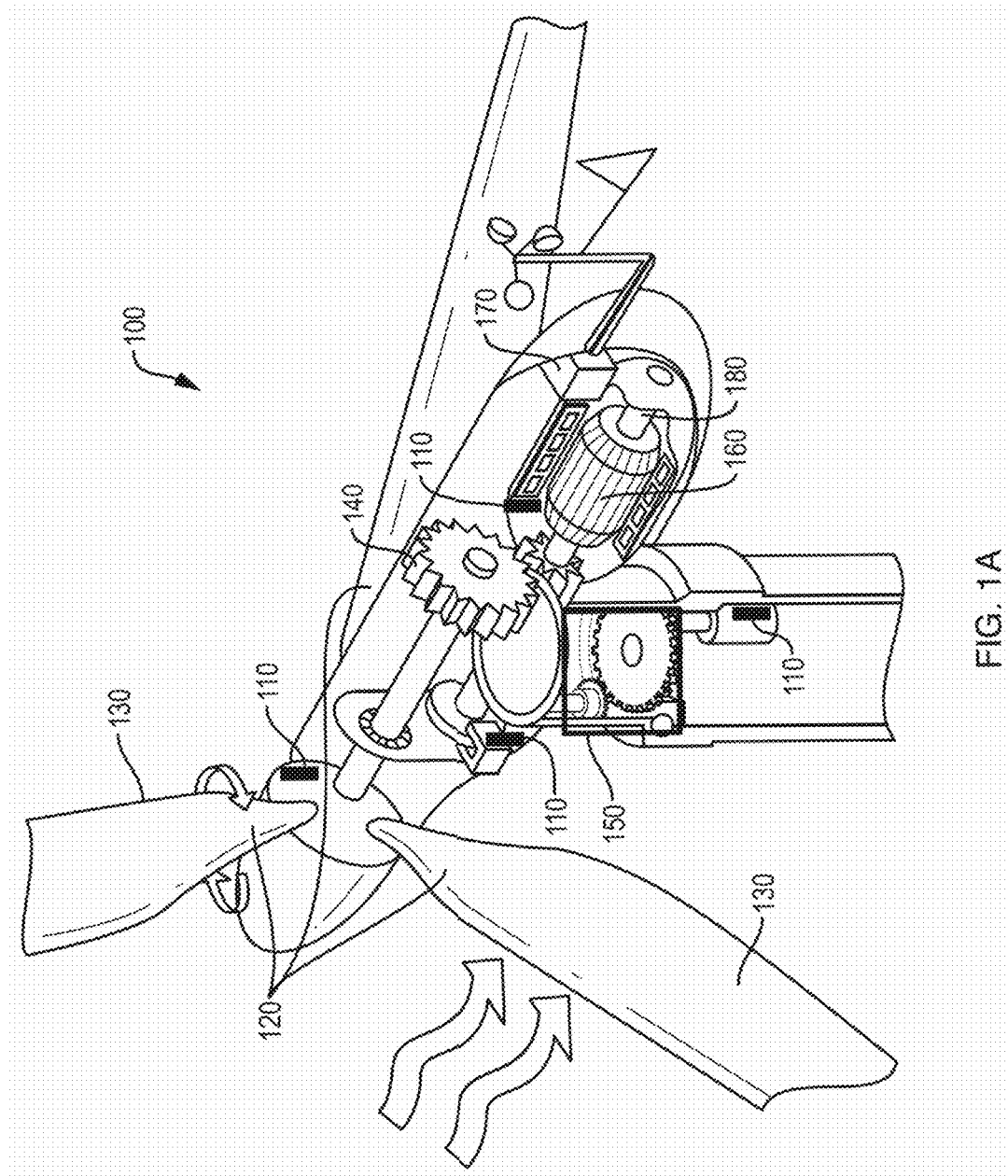
FIG. 1A is a diagram of the major components of a typical wind turbine in which embodiments of the invention may be practiced.

FIG. 1A illustrates a diagram of a typical wind turbine 100, which consists of a number of components, including a rotor 120, blades 130, a gear box 140, a yaw drive 150, a generator 160, a controller 170, and a high-speed shaft 180 mounted on a tower 190. Multiple sensors 110 installed at different locations measure and record sensor readings over time. Standard supervisory control and data acquisition (SCADA) systems are installed in most industrial wind turbines to collect measurements of sensors 110 from each wind turbine and store the SCADA data in a database server (not shown in FIG. 1A) at a specified sampling rate (e.g. sample/10 min) as an operation historian. Advanced monitoring systems can provide real time measurements of vibration in rotary equipment. Detailed vibration data along three directions at a given position on the turbine may be collected and stored in a database server. Embodiments consistent with principles of the invention allow users to load and utilize the SCADA data as well as vibration data from a condition monitoring systems (CMS) to build wind turbine models, as well as predictive and prescriptive analytics. The analytic models then can be validated and deployed online and used for wind turbine operation monitoring, anomaly detection, event diagnosis and failure predictions.

Figure 1B:
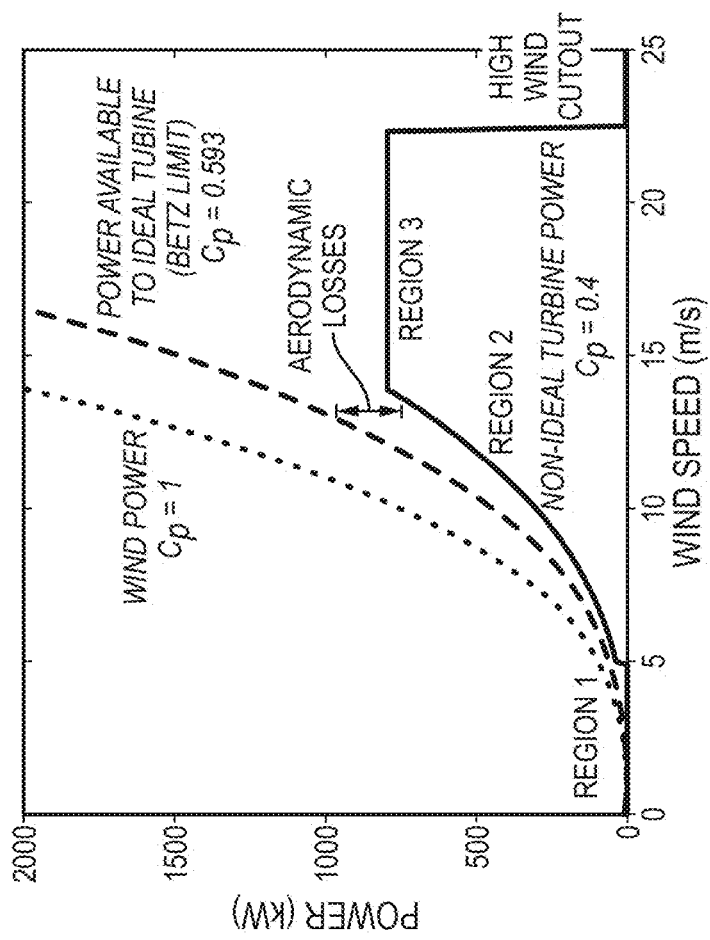
FIG. 1B illustrates an exemplary operation curve of a typical wind turbine

FIG. 1B illustrates a generic wind turbine operation curve, which depicts the relationship between output power and hub height wind speed as an important characteristic of the wind turbine. The power curve is helpful in understanding the principles of a wind turbine's aerodynamics and measuring its energy generation efficiency. Therefore, the power curve also aids in energy assessment, warranty formulations, and performance monitoring of the turbines.

In current industrial practice, data handling can be a burden for practitioners. As an example, historical industrial operation data contains hundreds to thousands of sensor measurements, millions to billions samples and those data contain at least one or more bad segments, such as gaps (missing values), outliers, High/Low saturations, frozen signals (no value changes over a period), messed sampling (unsynchronized) data samples etc. To prepare data for building model and analytics, users need to perform many steps, such as loading, viewing, editing and repairing to prepare data. Current industry practice involves mostly manual operations with data-loading and graphical software, and it is typically time consuming. For huge datasets from wind farms, it can be impossible to accomplish the task by manual operations.

Embodiments consistent with principles of the invention use a technique to perform data pre-processing, which includes data screening, repairing, and other preparation such as filtering, aggregation etc. In one embodiment, an automated data screening and slicing technique (described in U.S. Pat. No. 9,141,911, for example, which is incorporated herein by reference in its entirety) may be applied to a dataset for bad data identification and data cleaning. Further in other embodiments, the system may label and select "normal operation data" by applying an improved unsupervised AI/ML data clustering algorithm, which enables an automated, quick and highly efficient data selection process and avoids user to do the tedious and time-consuming conventional data preparation steps.

In embodiments consistent with principles of the invention, an important aspect is the definition of a parameter for modeling a wind turbine, i.e. Efficiency of Wind-To-Power (EWTP) ratio as a measurement of a key-performance-indicator (KPI) in the applications, which not only enables simplification on the description and structure of an aerodynamic theoretical model, it also provides an opportunity to use and benefit from the latest AI and machine-learning algorithms such as data clustering and labeling for automated data selection, which makes the system more efficient than prior approaches while keeping the model explainable with good physical sense and consistent with domain knowledge.

In the prior art, both full principle-based models (e.g. theoretical aerodynamic model) and pure data-driven black-box models (such as a polynomial or a neural network model) encounter many challenges in industrial applications. For example, an aerodynamic model usually contains a number of complex mechanical parameters and many unknown energy transformation coefficients, while a pure data-driven black-box model is often lack of physical explanations. Embodiments of the invention use the EWTP definition as a base, and an innovative technique that allows a combination of a simplified aerodynamic model with modern data-driven modeling techniques. As a result, the disclosed method significantly reduces the complexity of traditional wind turbine model while maintaining physically explainable model features that facilitate applicable data analytics development and online performance monitoring.

Using a simplified aerodynamic model based on EWTP, embodiments of the method allow more rigorous and effective monitoring of a wind turbine than current industrial practice. Any irregular performance in operation and anomalous behavior can be detected in a timely manner and an operation center may be notified with an email or other means of communication for early attention and improved maintenance planning. In addition, a deployed aerodynamic model based on EWTP can be easily adapted with new operational data when the model degradation is detected. The EWTP based aerodynamic model, due to its linearized model structure, is much more flexible and adaptive than traditional models, therefore, are more suitable and applicable to industrial applications than other models.

Systems consistent with principles of the invention allow for effective use of industrial operation SCADA data from wind turbines and wind farm, provides a computer implemented system and method for automated data processing, data labeling and selection innovative techniques for building and deploying wind turbine models, and enables efficient monitoring of wind turbines. As a result, the energy industry can benefit by easy data handling and historical data use, more efficient predictive analytics, improved operation monitoring and prescriptive maintenance, reduced cost and sustained performance with improved operational margins.

Figure 2A:
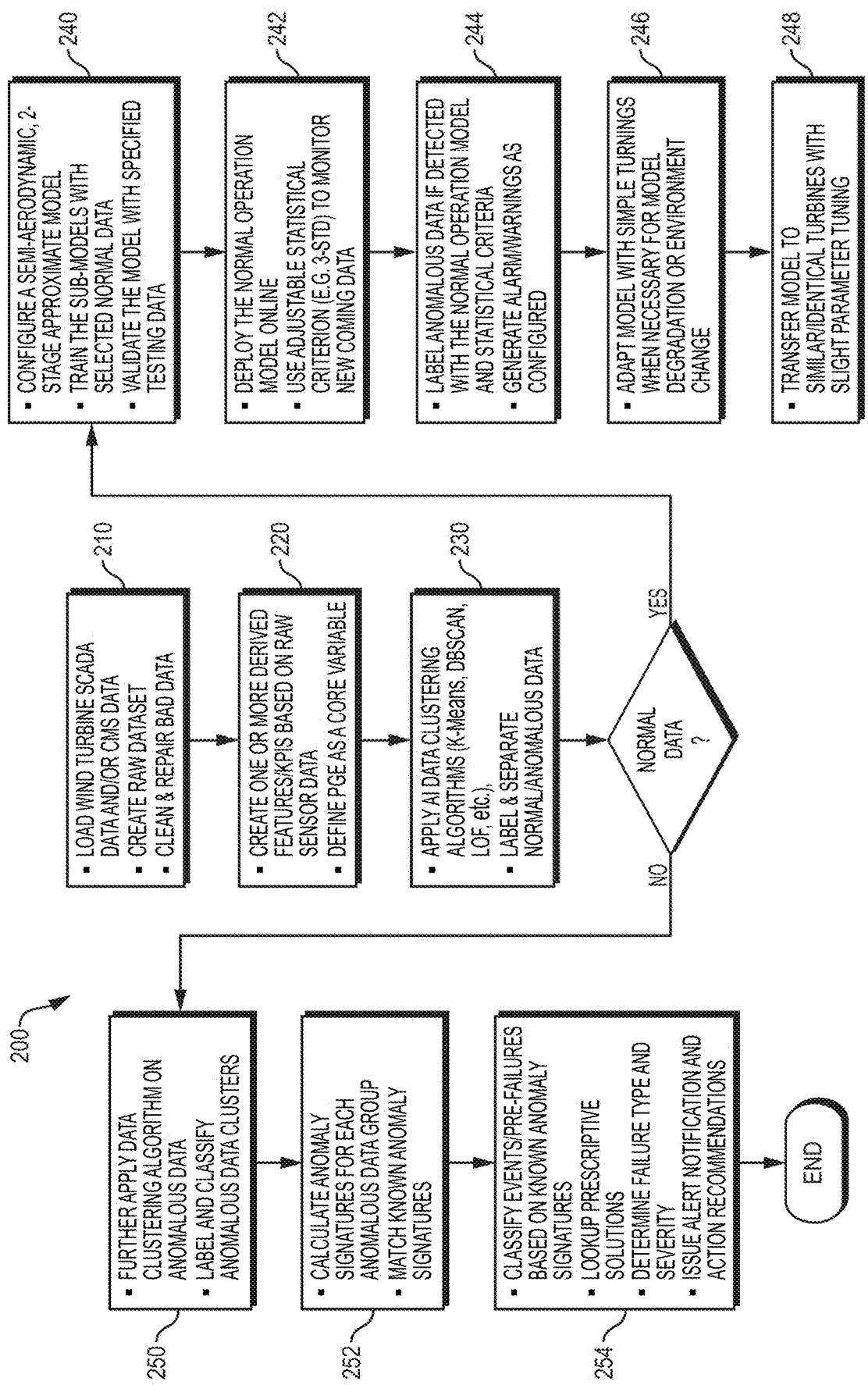
FIG. 2A is a flow diagram illustrating a workflow for building prescriptive analytics in a wind turbine consistent with embodiments of the invention.

FIG. 2A illustrates an example workflow 200 of a system for building and deploying predictive and prescriptive analytics with SCADA data to help reduce unnecessary shutdowns and prevent failures. Differentiated from many prior-arts research approaches and practices in industry, embodiments of this invention provide industrial practitioners with a novel modeling approach and systematic innovative techniques for building wind turbine analytics, which includes loading and pre-processing sub-system to load and transform historical operation sensor data such as the data collected from the turbine supervisory control and data acquisition (SCADA) system (also called as SCADA data). Each SCADA dataset may contain tens to hundreds of time series of sensor measurements collected from at least one or more wind turbines. The system may also load and use data measured with high-frequency-sampling from dedicated condition monitoring systems (CMS), such as vibration measurements if they are available; further, the system method may load and use metadata, for example, operational logs, repair records, orders of equipment and parts, and such; creating, from the received data, a working dataset; the working dataset creation being automatically performed by the one or more processor.

In some embodiments of the present invention, the working data set may be created using the following steps: (i) processing the received includes at least one of identifying bad data segments, such as missing values or "NaN" and repairing some of the bad data segments with estimates, and preprocessing the dataset for later use; (ii) aligning data over time against a reference target sensor measurement in an automated manner by performing a dynamic correlation analysis among all process variables of the subject wind turbine; (iii) identifying the peak values of correlation coefficients over a time window between each variable and the target variable; and grouping highly correlated measurements of the set of sensor variables; and (iv) shifting the data measurements data over time against a target variable, from the dataset of the received data corresponding to each of the variables and at least one of the target variables (e.g. a target temperature sensor measurement, the output power of a wind turbine, etc.) based on the identified maximum correlation peak values at which the time-shifted between two sensor variables. The created working dataset being formed of and stored as the generated dataset.

In embodiments of the present invention, the system labels and separates the generated and stored dataset with a highly efficient unsupervised AI data clustering algorithm, which facilitates identification and data selections of a wind turbine's normal operation data vs. anomalous data. It also configures and trains a semi-aerodynamic 2-stage wind turbine operation model by using the labeled and selected normal operation data, AI feature engineering, and regression algorithm. The simplified aerodynamic model may be validated with reserved normal operation testing dataset. The validated aerodynamic model may be deployed online for real-time wind turbine performance monitoring where a key performance indicator (KPI) is defined and monitored online with an alarm threshold that may be statistically set, for example, using a 2-sigma/3-sigma rule for 95% and 99% confidence individually.

Systems may monitor the performance of a wind turbine with the validated and deployed simplified aerodynamic model, identifying and labeling anomalous behavior in operation data, issuing alarm or warning messages to users according to pre-configured criteria. When model degradation is observed, the system may adapt the simplified aerodynamic model by adjusting two model parameters. In some embodiments, the system may transfer the aerodynamic model to similar or identical wind turbines with slight tuning of the two key model parameters for transfer learning.

Workflow and Steps

FIG. 2A illustrates an example method 200 of building and deploying wind turbine model and analytics for building predictive and prescriptive analytics with SCADA data. Embodiments include, for example, loading and cleansing wind turbine SCADA data at step 210, then creating one or more derived KPI(s) or Engineering Feature(s) (EF(s)) at step 220. The system defines a key feature, such as Efficiency of Wind-To-Power (EWTP), which is the ratio of electric power output over wind speed input. The system may apply specific unsupervised AI data clustering algorithms to label and separate normal operation data and anomalous data at 230 in an automatic way. The labeled normal operation data and anomalous data are further extracted out and split into two sub-datasets at 230; for normal operation sub-dataset some are used for model training, and others are reserved for model validation or testing. In embodiment of the invention, the system may further apply a semi-aerodynamic 2-stage model covering the normal wind turbine performance at different wind speeds ranges and trains the model with transformed EWTP data at 240, and the method 240 further validates the trained model with one or more testing sub-datasets. The system deploys the validated model at step 242 online for wind turbine performance monitoring, and once anomaly event(s) detected by the pre-configured criteria, the system and methods further issue alarm and warnings to users at step 244; The system is able to detect and adapt a model with changes of environment or operation conditions at step 246; and the system may also perform a model transfer learning from one wind turbine model to another with minimal tunings on model parameters at step 248.

For anomalous dataset clusters labeled in the first run of data clustering (step 230), the example system includes further data clustering and labeling to help users find different groups of anomalous data. The system further applies one or more data clustering algorithms such as K-means algorithm or principal component analysis (PCA) at step 250 on one or more core features like EWTP against wind speed. In such a way, the different anomalous data are automatically clustered based on their similarity, i.e. each data cluster labeled by the K-means algorithm showing similar wind turbine performance under similar wind-speed conditions. At step 252, the system further calculates one or more KPI(s) or Engineering Features that represents each anomalous data cluster and pre-defined based on domain expertise, e.g. gearbox sensor temperature deviations from its historical baseline range, temperature differences between each two of three phases of generator, RPM ratio between wind turbine rotor speed and generator speed, and such. The system 200 may further detect and match known anomaly/pre-failure signatures. At step 254, the embodiments of system may further help users by automatically performing at least one or more actions but not limited to the following: classifying detected anomalies/pre-failures based on matched known anomaly signatures, looking up prescriptive guidance for wind-turbine maintenance intervention, determining the type and severity of the anomaly, issuing alert/alarm notification and action recommendations, etc. to realize the predictive and prescriptive analytics online.

Identifying and Labeling Normal and Anomalous Operation Data From a Scada Database FIG. 1A is an illustration depicting an example of wind turbine structure and components in which embodiments of the present invention may be practiced. A wind turbine is driven by wind power and the wind power is measured as wind speed (m/s) and wind direction. A control system (Yaw Control) adjusts the wind turbine against the wind direction and change the blade pitch 130 angle in order to catch the maximum wind power. One of the characteristics of wind turbine operation is that the wind speed and wind direction are never be constant, fluctuating wind speed and the output power make it difficult to model a wind turbine and assess efficiency of a turbine. Therefore, understanding the basic principles of a wind turbine is pre-requisite for building correct wind turbine models and analytics.

FIG. 1B is a diagram depicting an example of wind turbine normal operation curve at different wind speed environment. The x-axis is wind speed, three regions are divided, when the wind speed (WS)<5 m/s at region 1, the wind turbine is not running; once the wind speed increases up to region 2 (5<WS<14), the wind turbine starts to run and generate more electricity with the increase of wind speed; when the wind speed further increases up to region 3 (14 m/s<WS<23 m/s) the wind turbine will generate constant electricity power output and controlled by the wind turbine control system 170. With respect to FIG. 1B, the dotted-line represents a theoretical wind power curve with a maximum power ecoefficiency (Cp=1), the dashed-line represents a power curve by an ideal turbine (also called Betz Limit, Cp=0.593); whereas the solid-line displays a practical industrial wind turbine's power curve (Cp=0.4) due to aerodynamic losses in practice.

Figure 3A:
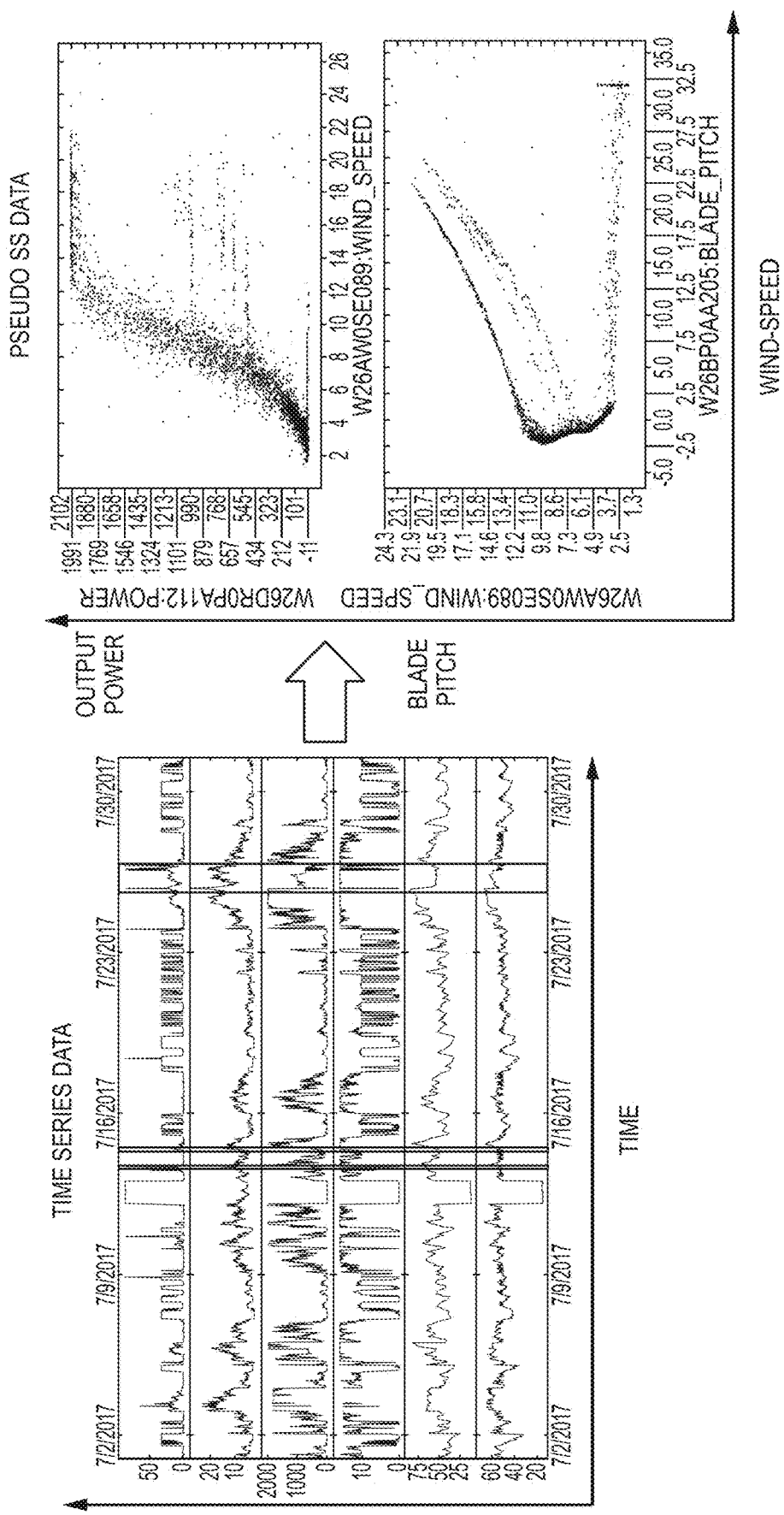
FIG. 3A is a chart mapping the transformation of SCADA data from the time-domain to wind-speed domain for data viewing and clustering.

As shown in FIG. 1B, most theoretical analysis and models of a wind turbine is based on a presumed steady-state or static relationship between wind speed feeding into a wind turbine and the output electrical power generated by the wind turbine. In the real-world industrial practice, wind speed never holds at a constant value and changes over time. A standard SCADA dataset consists of multiple time series of sensor measurements. For easy view and analysis, this dataset is mapped into a 2-D display. Typically, a 2-D scatter-plot is used by showing measurement values against wind speed measurement values at a point in time. FIG. 3A illustrates examples of the output power vs. wind speed, and blade pitch measurement vs. wind speed. This data analysis is used in connection with data clustering and model building in embodiments consistent with principles of the invention.

A number of prior art approaches have been applied to modeling wind turbine power curves (WTPCs). Those models presented in the literature may be characterized as parametric or non-parametric. Examples of parametric models include: the piecewise linear model, polynomial power curve, maximum principle method, and dynamical power curve. In the piecewise linear model, the lines represent the data fitted according to the least square criterion. More accurate WTPCs were modeled with polynomial equations, ranging from quadratic power curve models, to cubic and approximate cubic, exponential, and ninth degree polynomial models. The maximum principle method was proposed to build a dynamic empirical power curve model. The main idea behind the dynamic power curve is to partition the wind power output into deterministic and stochastic components, as for example in the Langevin model.

Departing from the prior art mentioned above, embodiments consistent with principles of the invention use a novel power curve model to describe a wind turbine's performance. Efficiency of Wind-To-Power (EWTP) is defined as a ratio of power output of a wind turbine over the wind speed, i.e.

$$EWTP(t) = Power(t)/Wind\ Speed(t) \quad (1)$$

Also, another engineering feature X(t) is defined as $$X(t) = 1/Wind\ Speed(t) \quad (2)$$

Figure 3B:
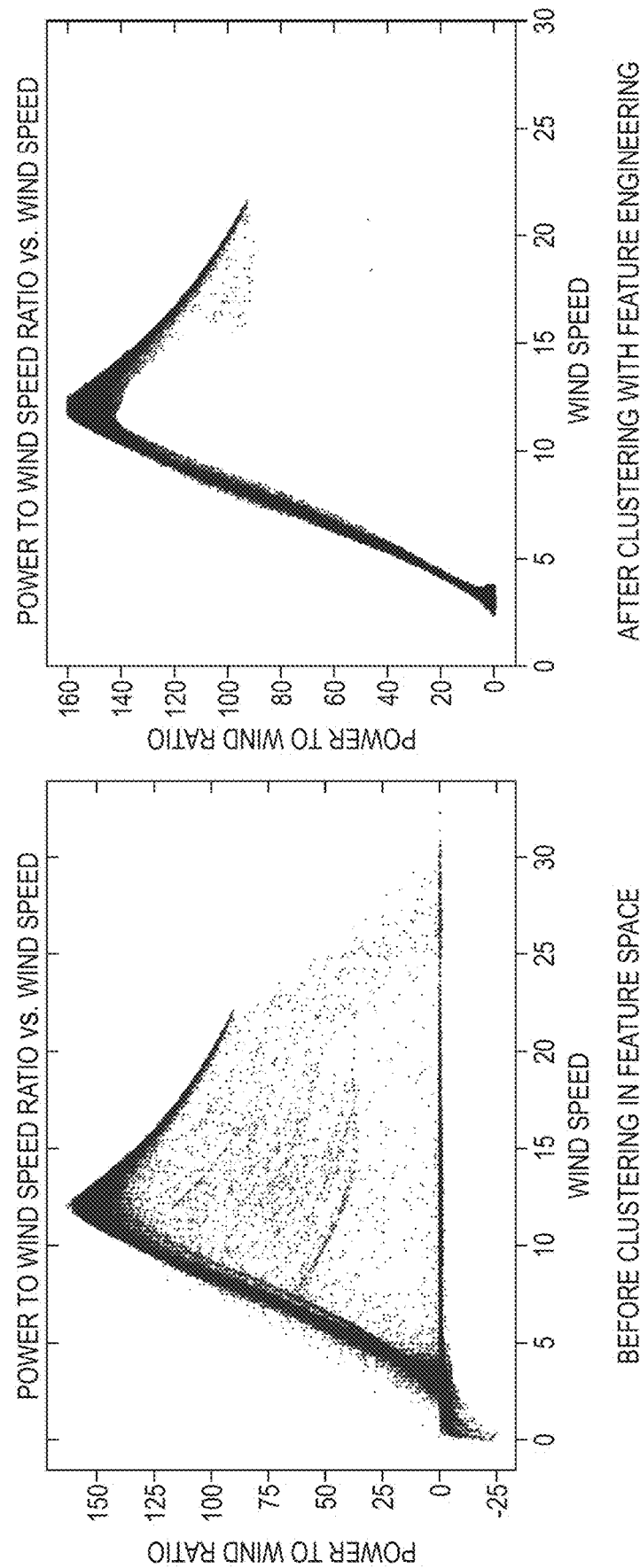
FIG. 3B is a chart illustrating data clustering and labeling through feature engineering.

The engineering features defined in Eq. (1) and (2) are useful for data clustering, labeling and model development; FIG. 3D illustrates two charts: (a) a typical power curve of an industrial wind turbine; (b) a new power curve using EWTP vs. wind speed for the same wind turbine operational data.

The new power curve EWTP has significant advantages: (1) the EWTP curve smoothens the relationship curve against wind-speed in operation region 2, which leading to a simple wind turbine model (see description later); (2) it stretched the curve in region 3, able to show more details than the classical power curve with saturation (flat in region 3); (3) it is more suitable for normal operation monitoring than classical power curves used in prior arts); (4) the EWTP makes good physical sense for users from the view point of considering wind turbine as a black-box with wind-speed as input and power generation efficiency as output.

Figure 2B:
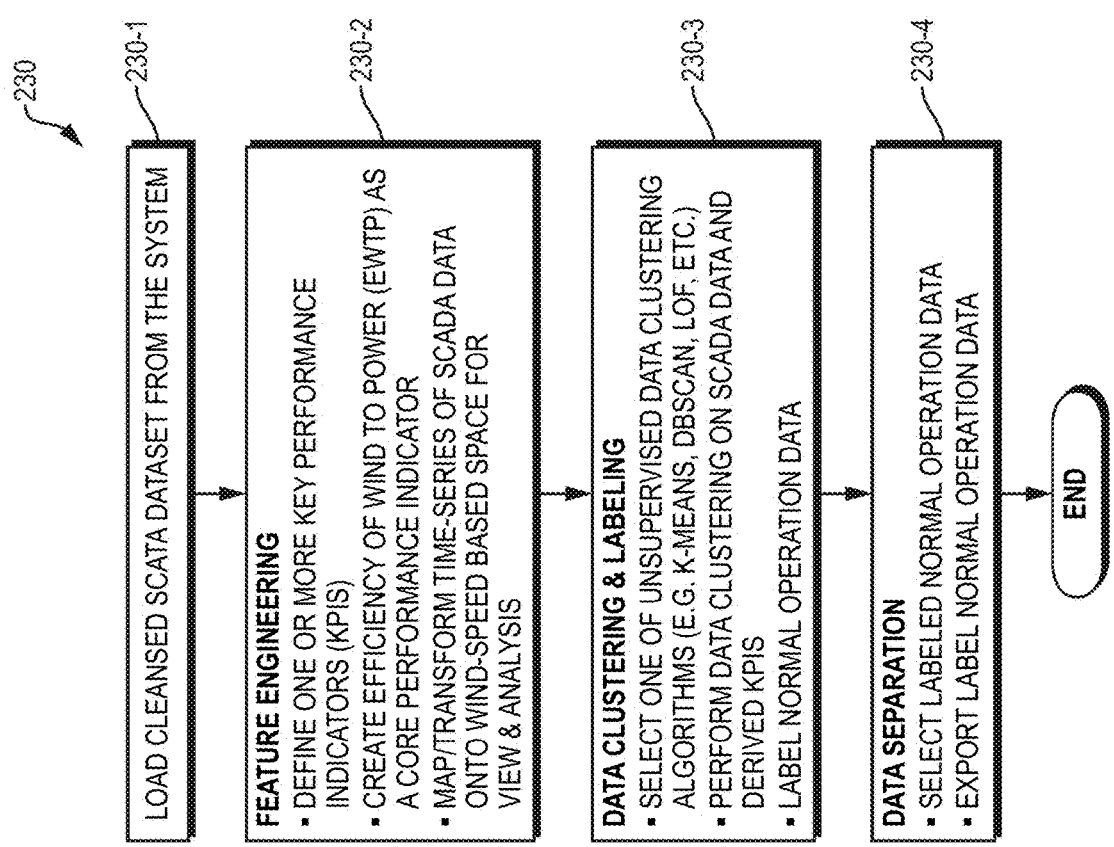
FIG. 2B is a flow diagram illustrating the sub process of data clustering and separation consistent with embodiments of the invention.

FIG. 2B illustrates an example step 230 of performing automated data clustering and labeling of normal operation data vs anomalous data. The example includes loading one or more wind turbine's SCADA data at step 230-1, defining and calculating one or more KPI(s), for example, the defined Efficiency of Wind to Power (EWTP) as a core KPI to be calculated, viewed and used for quick pre-assessment of the performance of a wind turbine in a scatter plot of EWTP vs. Wind-Speed (WS) at step 230-2. One or more data clustering algorithms is selected 230-3 from many of unsupervised Machine Learning (ML) algorithms for data clustering, e.g.

K-means, density-based spatial clustering of applications with noise (DBSCAN), local outlier factor (LOF), and such. FIG. 3B illustrates embodiments performing data clustering with the selected ML data clustering algorithm, as a result, normal operation data from a wind turbine's raw SCADA data are labeled automatically because normal operation data of a wind turbine should show a highest density while the selected DBSCAN or LOF is good at clustering and labeling first data cluster with the highest density. The system selects labeled normal operation data and export them as a "normal operation" sub-dataset at step 230-4.

Build and Deploy Normal Model

In theory, the aerodynamics for a wind turbine can be derived and described as a relationship between the wind speed v and output power P as following:

$$P = \tfrac{1}{2} C_p * A_s * \rho * v^3 \qquad (3)$$

For a specific wind turbine, the actual power curve is derived from the wind power values recorded from the corresponding speed for the time series by taking the instantaneous power output from the turbine. The turbine power curve (TPC) can also be obtained by using a nonlinear transformation function for wind power as stated below. It is important to state here that the TPC can actually be divided into three regimes, the non-linear (also cubic) transformation of wind speed to wind power when incident wind speed ranges between 3.0-13 m/s (region 2 in FIG. 1B), the linear regime during which the power output is constant for a rated wind speed of 13-23 m/s (region 3 in FIG. 1B), and the saturated regime where power output is negligible due to turbine shut-down for too high wind speeds greater than 23 m/s as illustrated in FIG. 1B.

Although this relationship is the basis for the power curve used for wind power estimation, using this model may also cause estimation errors, often an over estimation of the actual power produced, as seen in the time series in FIG. 1B above, and as documented in the other studies highlighted, especially when considering hourly averaged wind power. These errors have been attributed to some energy meteorology parameters such as shear, turbine age, atmospheric conditions, ambient turbulence, thermal effects and surface roughness, although there are limited scholarly articles to validate and quantify these impacts.

A polynomial relation referred to as the effective power curve in the form of $$P = Av^2 + Bv + C \qquad (4)$$

is found practically useful as the polynomial parameters A, B, and C can be fit individual turbine data and therefore offers more freedom and flexibility to approximate many known and unknown impacts of various factors in practice.

In the embodiments consistent with principles of the invention, model for a wind turbine is disclosed, which is a simplified and approximate, yet aerodynamic model by use of the core KPI defined in Eq. (1) in the form of:

$$EWTP = \begin{cases} K_p * v + b & \text{(region 2)} \\ K_M * x + c & \text{(region 3)} \end{cases} \qquad (5)$$

Where EWTP is a KPI variable, defined by Eq. (1) as a ratio of (P/v), v is wind speed, and x is (1/v) in region 3.

Mathematically, Eq. (5) approximates model Eq. (4). The result of using EWTP instead of P in the left side of equation (5), however, brings significant benefits over prior approaches: (i) two sub-models for region 2 and 3 become linear with wind speed v and x, which is much easier to fit data by simple regression; (ii) the simplified models are easy-to-use for online deployment in monitoring normal operation and detecting anomalies; (iii) it can be adaptive to different wind turbines as well as time-varying environmental conditions; (iv) EWTP as a measure of wind turbine efficiency, still provides a good physical meaning for industrial practitioners.

Figure 2C:
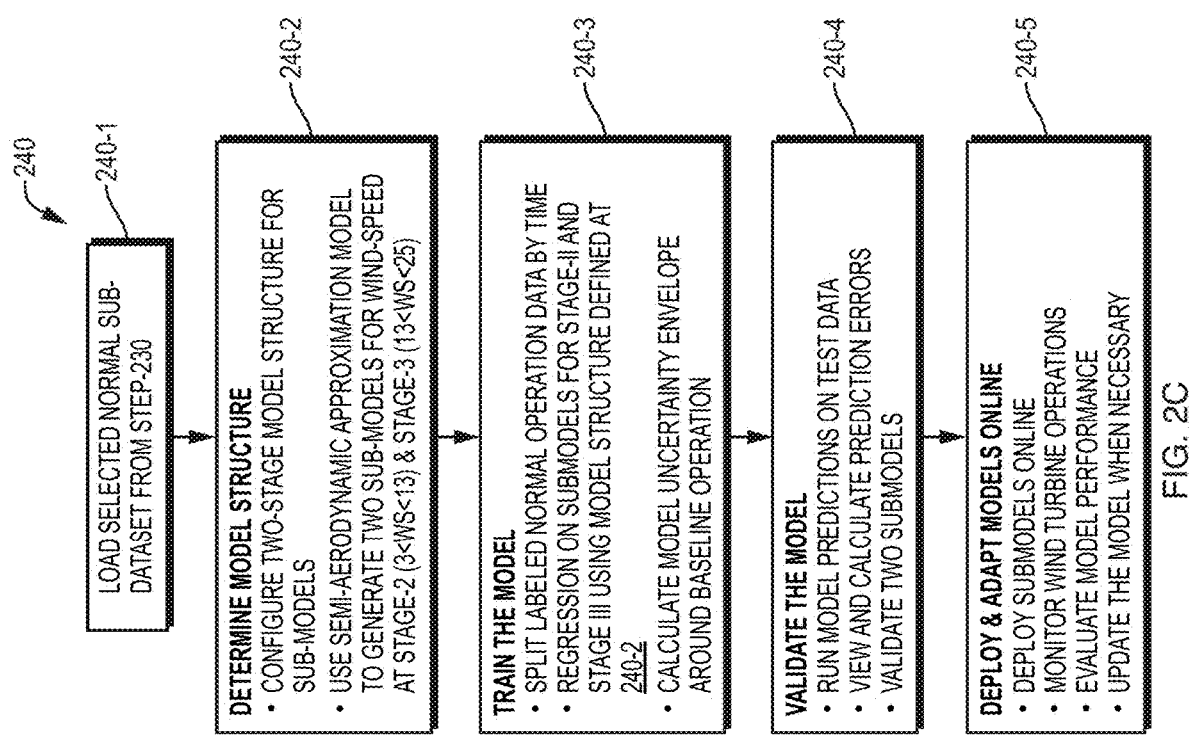
FIG. 2C is a flow diagram illustrating the sub process of building and deploying a normal operation model of a wind turbine consistent with embodiments of the invention.

FIG. 2C illustrates an example step 240 of building and deploying a normal operation wind turbine model. The embodiment first includes loading the "normal operation" sub-dataset created at step 230-4; then performs the following in a sequence by 240-2 to 240-5:

(1) automatically splitting the loaded "normal operation" sub-datasets into two groups according to the wind-speed (v), for region 2: (3 m/s<v<13 m/s) and region 3: (13 m/s≤v≤25 m/s) generating two new datasets, for example, named reg2 and reg3;

(2) calculating KPI variable EWTP(t) with Eq. (1) for both reg2 and reg3;

(3) calculating derived variable x(t) with Eq. (2) for only reg3;

(4) building the two simplified linear models Eq. (5) by linear regression with datasets reg2 and reg3 respectively;

(5) calculating statistical confidences with a 3-sigma envelops around the two model curves at 240-4 as thresholds for monitoring wind turbine operations when model deployed online;

(6) testing and validating the regression models with reserved test datasets at 240-4;

(7) deploying the regression model online to start monitoring future wind turbine operations by 240-5;

(8) evaluating the model's performance and updating the model at step 240-5 with fresh data when necessary.

FIG. 3D illustrates an example method of building normal operation analytics model of wind turbine with derived variables by using a simplified aerodynamic model structure in the method of FIG. 2A. In FIG. 3D (a), a polynomial empirical model fits the power curve (TPC) with the wind turbine SCADA data, it appears the model curve is nonlinear and the curve shape may change for different machine or over time; in FIG. 3D (b), a simplified model with derived KPIs fits EWTP~Wind Speed relationship well and resulted in a simple, linear regression model. In FIG. 3E, a 3-sigma (i.e. 3×STD) envelop calculated from normal operation data together with the simplified model is used for online wind turbine operation monitoring; and FIG. 3F shows model validation results by comparing model predictions against one-year long testing data. As a result, the feasibility and effectiveness of system and methods disclosed in this invention have been demonstrated and validated with industrial wind turbine SCADA data.

Anomaly Detection & Analysis

Referring back to FIG. 2A, in embodiments consistent with the invention, the loaded raw SCADA data from a wind turbine historical database are labeled and separated as normal and anomalous data at step 230. The normal sub-dataset is used to build normal model for monitoring as described in steps 240 through 248. For those labeled anomalous sub-dataset, the system further builds offline analytics including performing anomaly classification, event signature collection, catching and storing known failures fingerprints, as well as maintenance intervention records with analytical results. Once analytics are built and deployed online, and once an anomalous event detected by a normal operation wind turbine model deployed at step 242, it will be classified by automatic signature-match and further assessed in severity with known failures. For often-seen anomalous events, a quantitative prediction of failures and prescriptive maintenance guidance may be provided, and alert notifications may be issued to users. As a result, unnecessary shutdowns can be minimized with early maintenance intervention, catastrophic failures can also be effectively prevented.

Figure 2D:
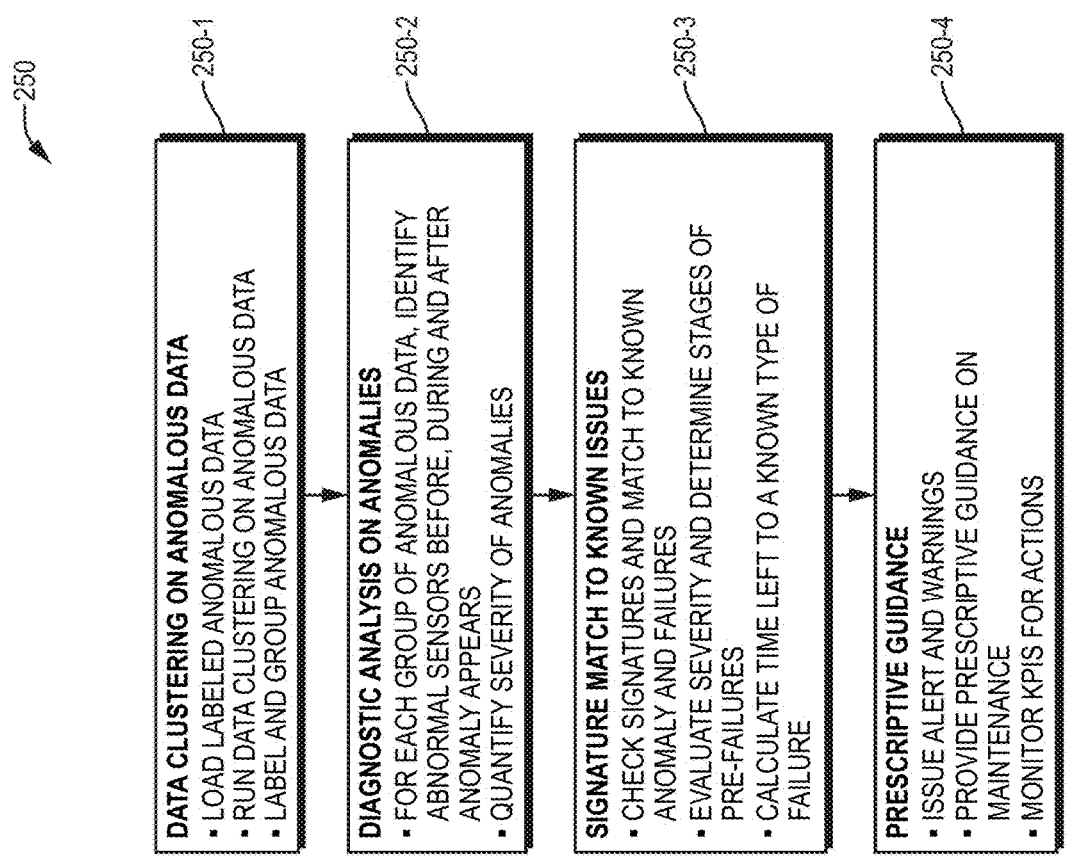
FIG. 2D is a flow diagram illustrating the sub process of detecting anomalies and analyzing them consistent with embodiments of the invention.

FIG. 2D is an example flowchart illustrating the step 250 of building prescriptive analytics from historical anomalous sub-dataset created in step 230. The step 250 includes the following sub steps:

Step 250-1: loading labeled anomalous data and running one or more unsupervised AI (e.g. K-means, DBSCAN, LOF) clustering algorithms to group anomalous data samples according to their similarity; as a result, historical anomalous operation data samples are labeled as groups based on their performance characteristics;

Step 250-2: the system enables users to review labeled and grouped anomalous data and perform diagnostic analysis on each type of anomalous event; for example, the system method 250-2 is able to assist diagnosis of an anomalous event by identifying and mapping labeled data onto one or more scatter plots, relevant sensor measurements over time, such as recorded wind turbine behaviors before, during, and after an anomalous event; with users' domain knowledge, the system method may further help user assessing the severity and risk of each identified event for a machine failure;

Step 250-3: the system may further include signature-match and failure-prediction when deployed online, where the system method automating the check of signatures (for example, KPIs for electrical components: temperatures at each of the three phases of the generator, transformer; KPIs for mechanical parts: rpm ratio of rotor to generator, and such) and assessing the servility by estimating pre-failure time left for known type of failures;

Step 250-4: the system further issues alert and alarm notifications once one or more detected anomalous events being diagnosed and predicted to lead a known type of machine failure with confirmed signatures; prescriptive guidance for early maintenance intervention is also being provided and learned from previous known failures and prevented failures; the system method 250-4 may keep issuing warnings until actions taken and the KPIs monitored being back to normal.

Figure 4A:
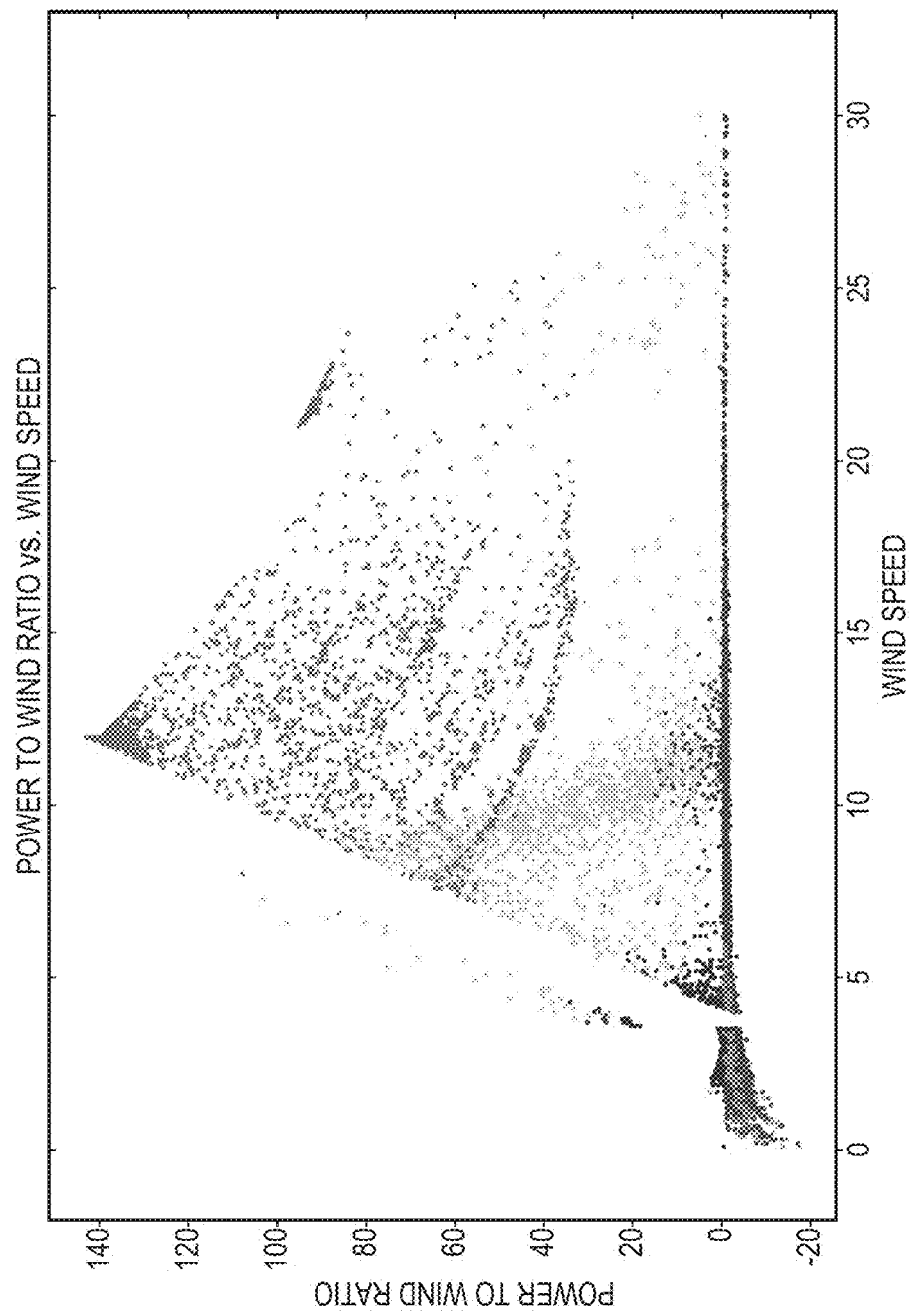
FIG. 4A is a chart depicting example of wind turbine anomalous data clusters and labels used in the methods of FIG. 2A.
Figure 4B:
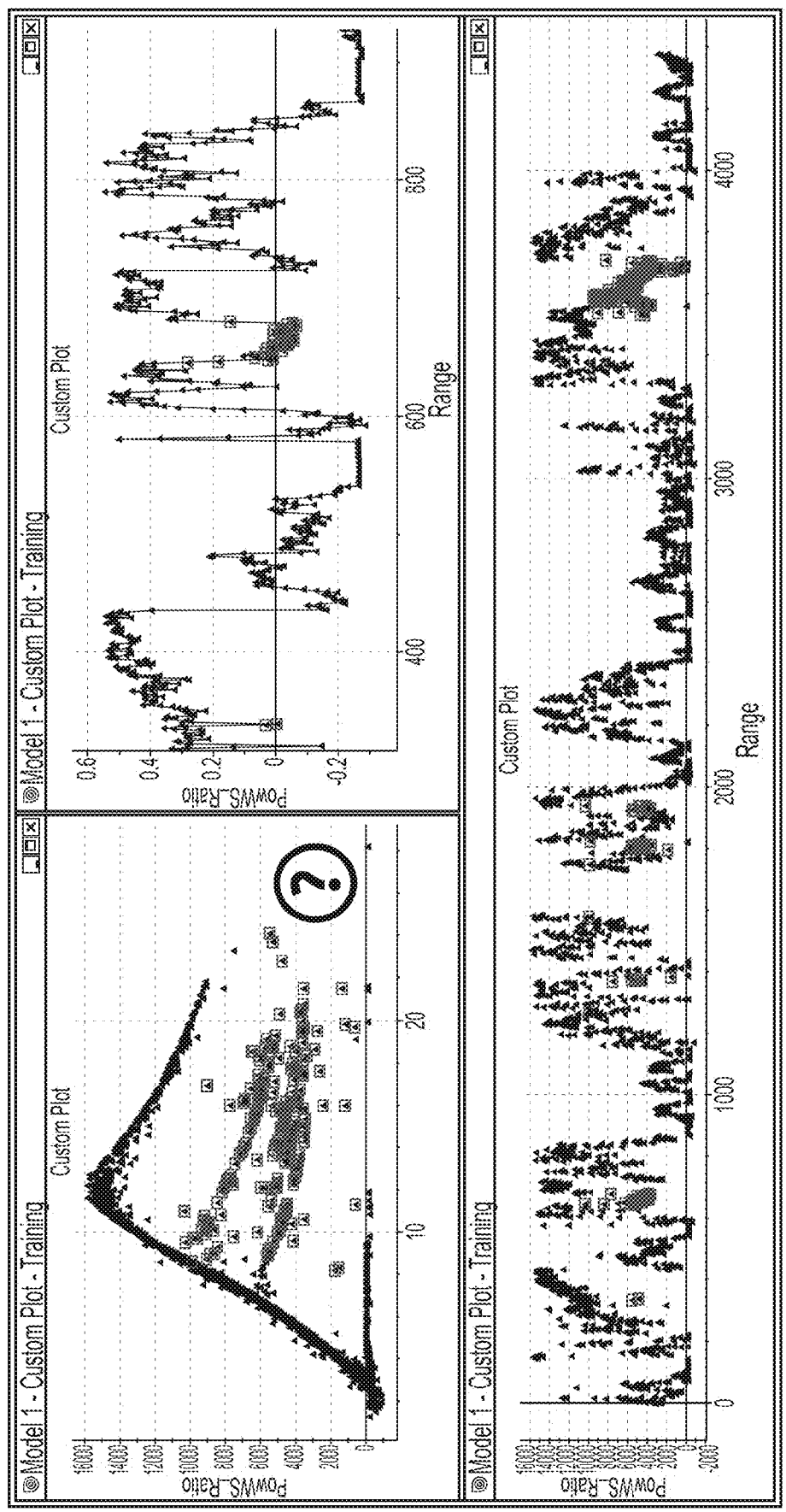
FIG. 4B is a diagram depicting an example method of anomaly detection, anomalous data labeling, and analysis mapping to a time-series window used in the methods of FIG. 2A.
Figure 4C:
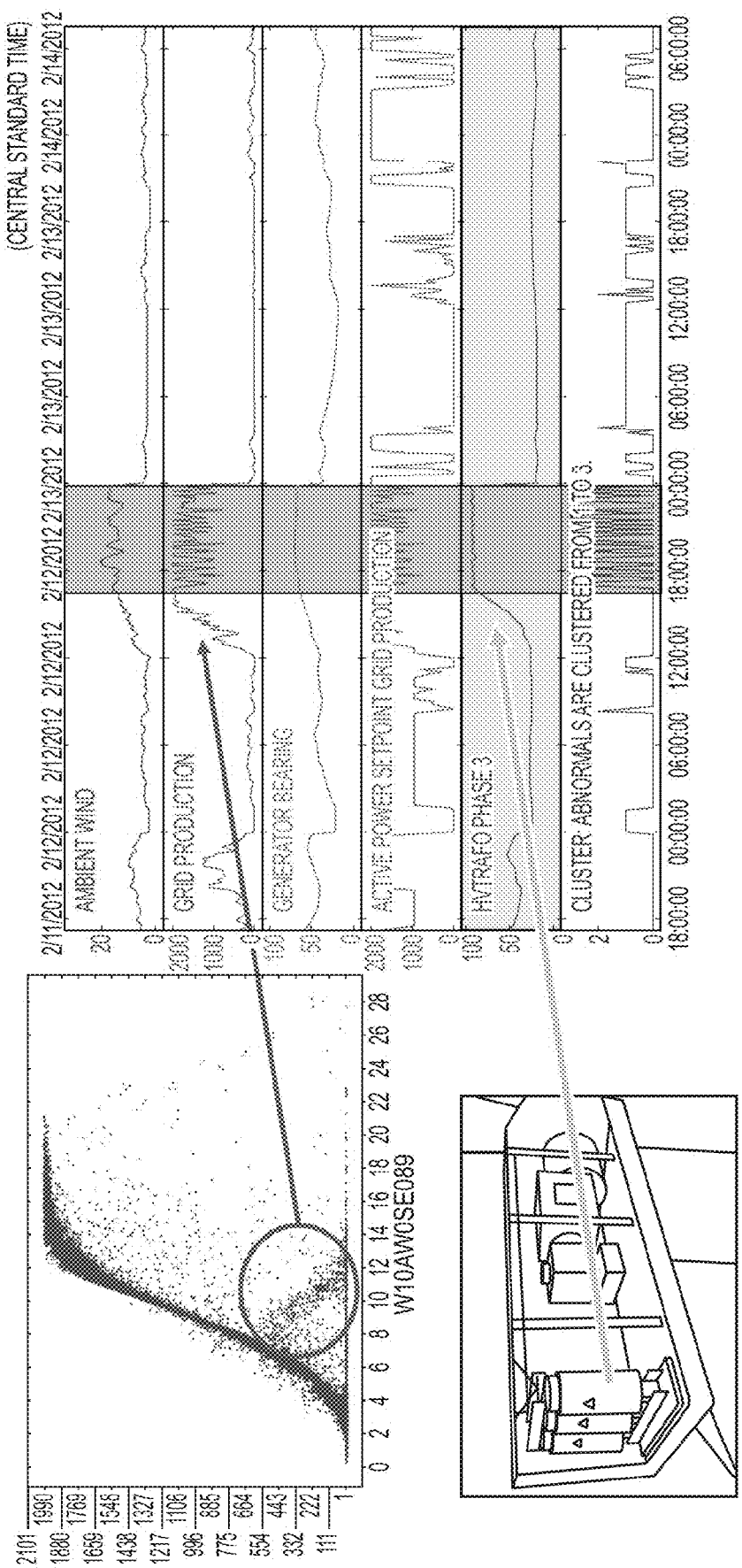
FIG. 4C is a chart depicting an example wind turbine anomaly in a signature identified and matched to one of known failures used in the method of FIG. 2A.
Figure 4D:
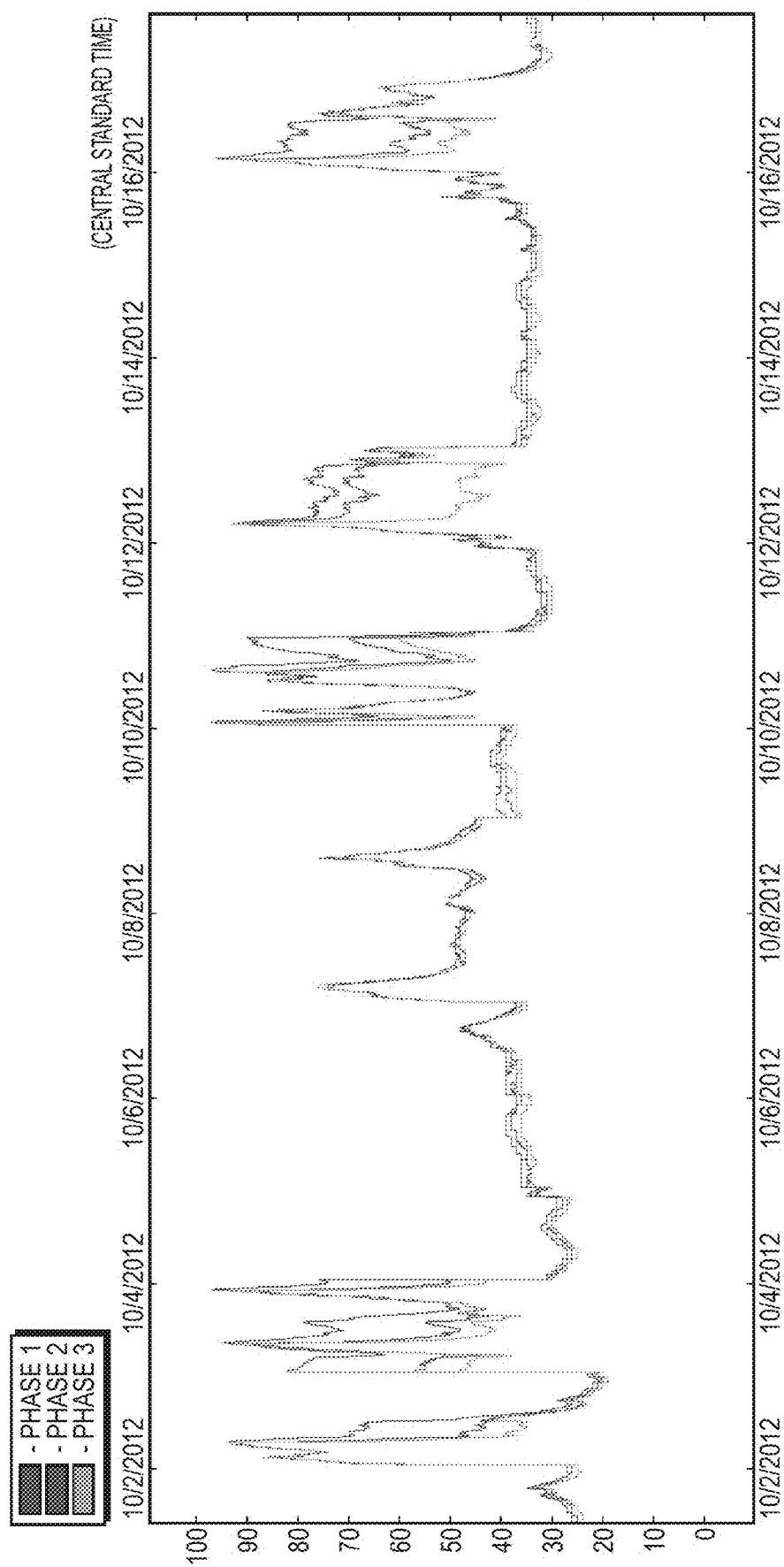
FIG. 4D is a chart depicting temperature monitoring of three phases of a wind turbine high-voltage transformer for pre-failure detection and a root-cause diagnosis used in the method of FIG. 2A.
Figure 4E:
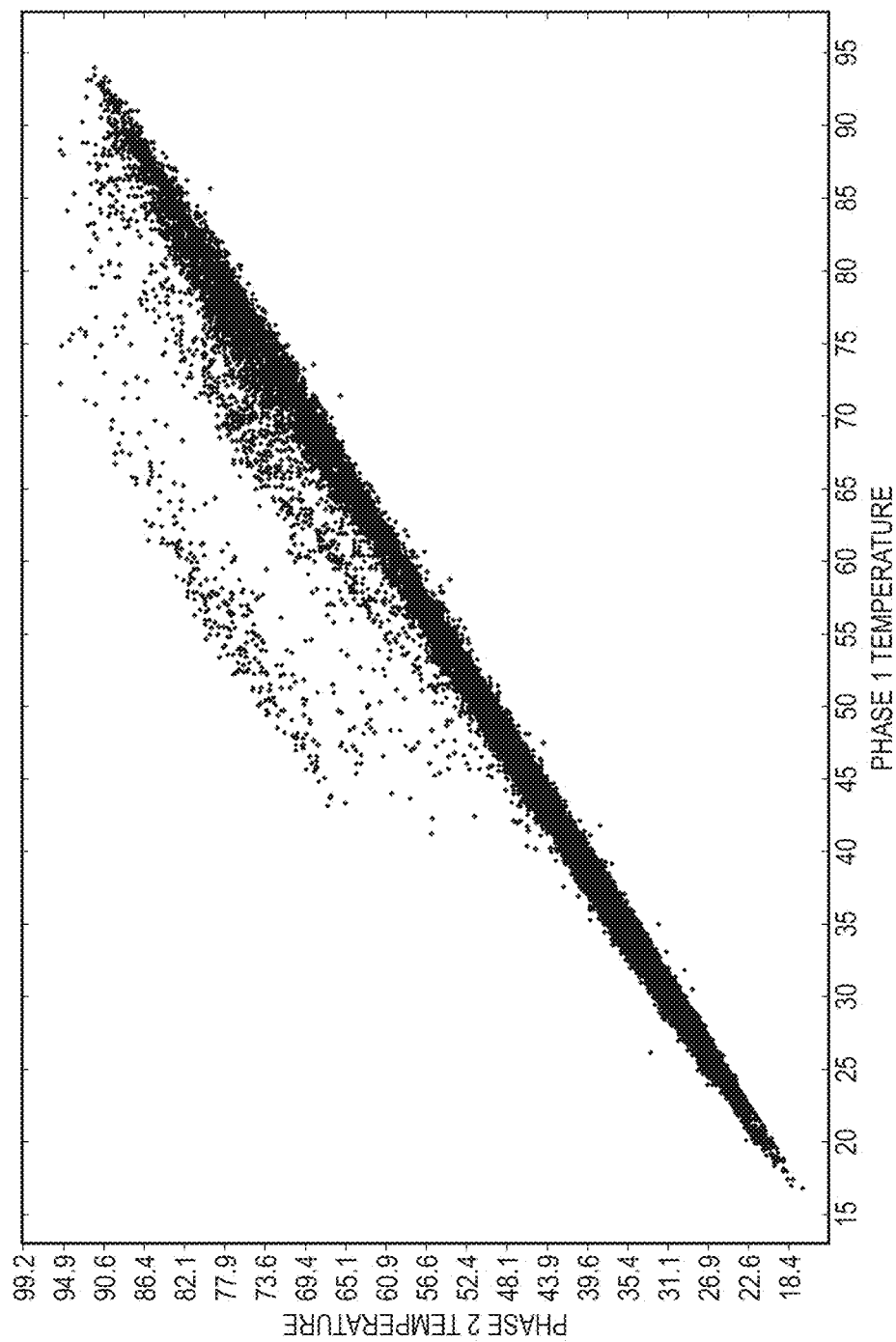
FIG. 4E is a chart depicting an example of pre-failure signature found in system assisting a user to diagnose a warning alert.

FIG. 4A illustrates an example result of method 250, four (4) major anomalous data clusters are labeled (with 4 colors) for a wind turbine with 4-year operational SCADA data. FIG. 4B shows an example of method 250 performing anomaly diagnosis by first mapping a labeled anomalous data cluster onto time-domain sensor measurements to learn when the events happened; FIG. 4C illustrates an example of method 250 assisting diagnosis by showing user relevant sensors measurements before, during, and after an identified anomalous event. FIG. 4D illustrates an example of a KPI signature for an anomaly. As shown, temperatures on two of the three phases of a wind turbine high-voltage transformer show significant inconsistency, indicating a potential insulation problem. Phase 1 (as illustrated in red) and Phase 2 (as illustrated in blue) demonstrate a tendency to reach higher temperatures as the wind turbine is at a higher load, and show a delay in temperature cooldown in comparison to Phase 3 (as illustrated in magenta). Mapping to time-series data of the three-phase temperature sensors, there are obvious temperature differences and lags observed after a temperature rise. As indicated in FIG. 4E, which illustrates a direct comparison of Phase 1 and Phase 2 from FIG. 4D, the plot map shows that there is a tendency for Phase 2 to operate at a higher temperature. A signature match with previous failures based domain knowledge tells that an insulation problem with the high voltage transformer appeared and an alter notification being issued by the method 250 to prevent potential catastrophic failures.

Online Deployed Model and System

Figure 3C:
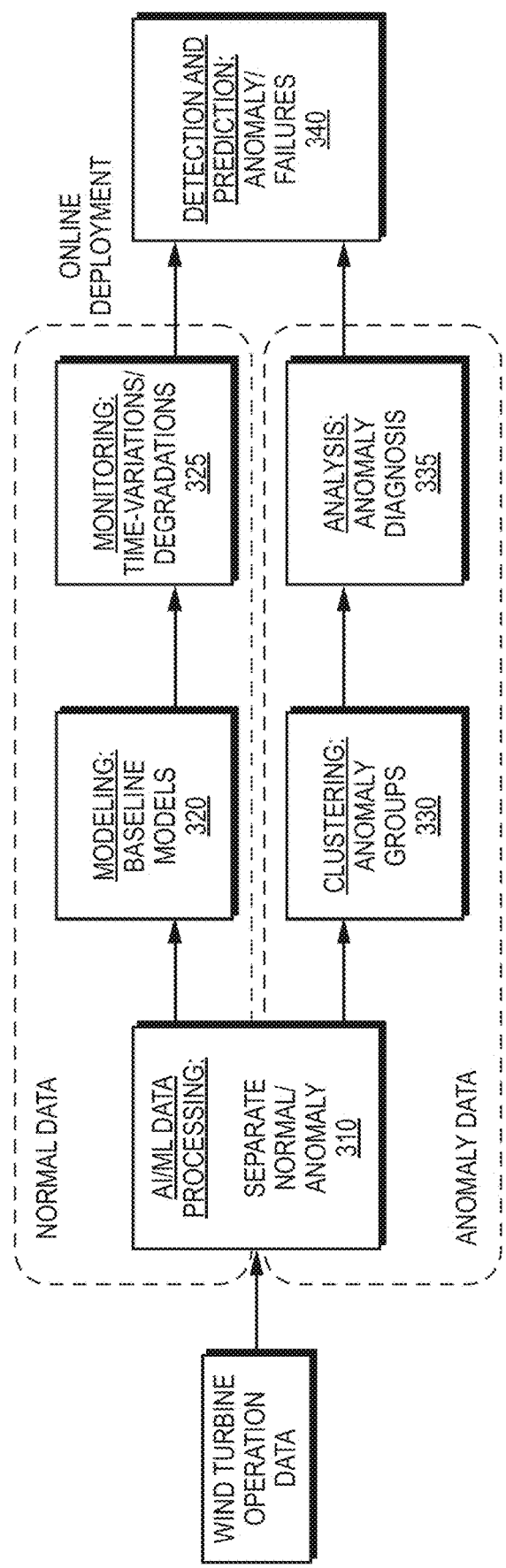
FIG. 3C is a chart illustrating a workflow for building normal operation model
Figure 3D:
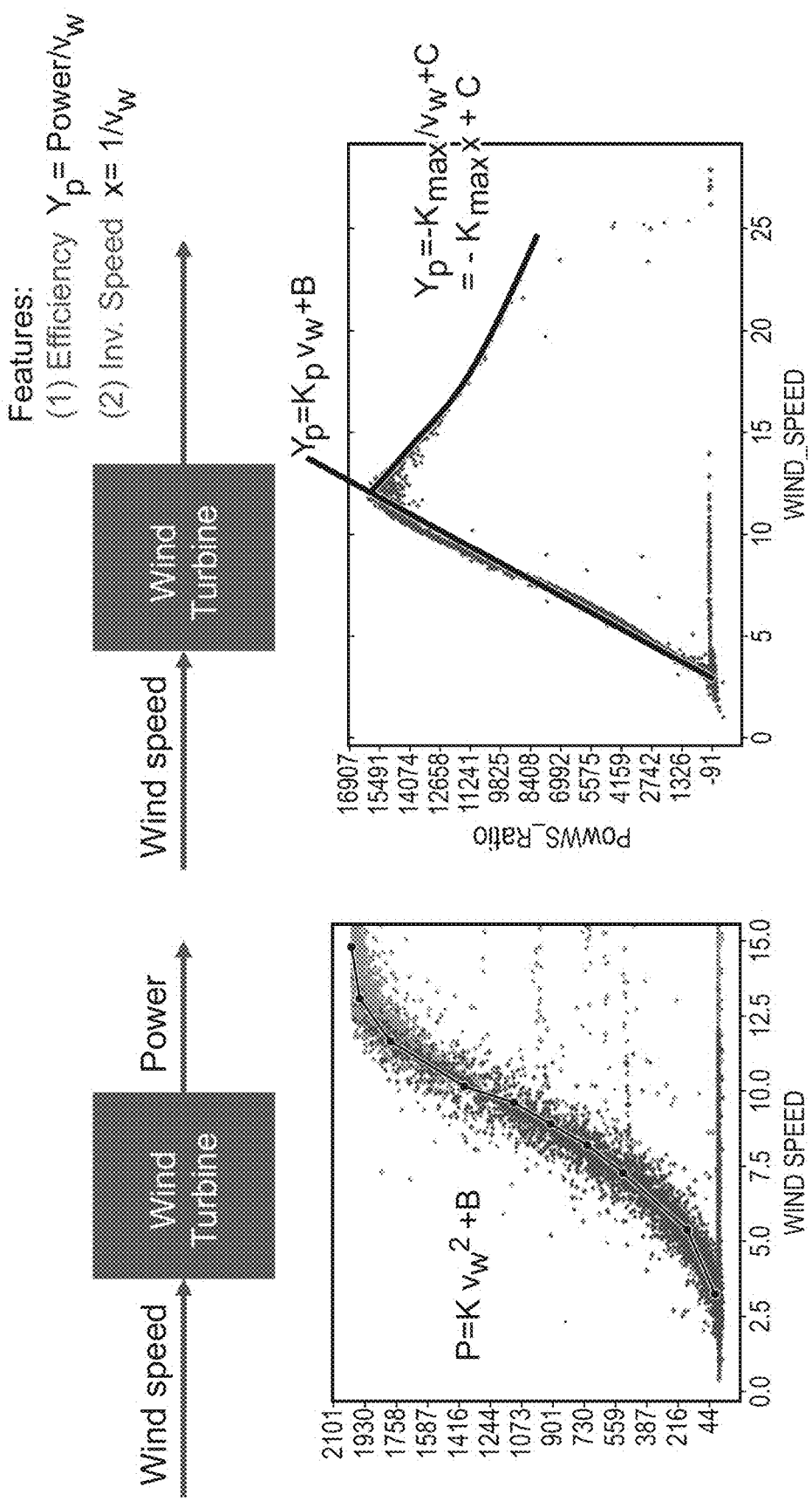
FIG. 3D is a chart illustrating building a normal operation model with derived variables by feature engineering
Figure 3E:
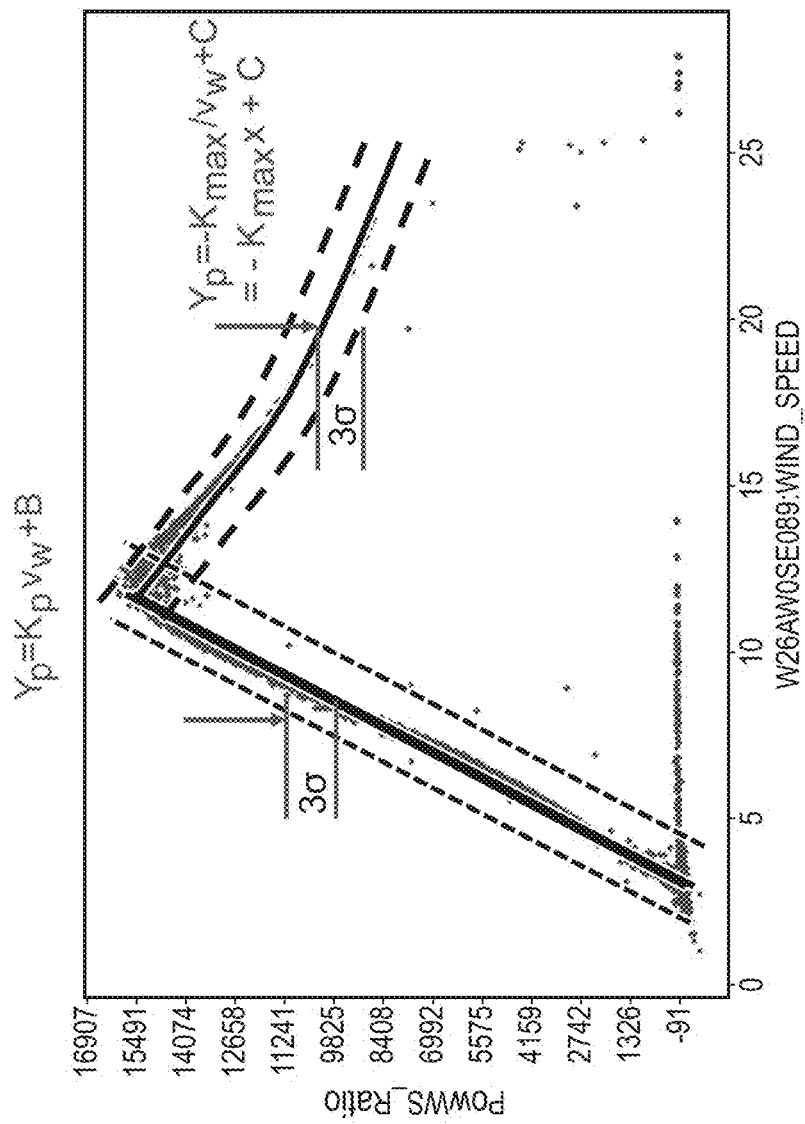
FIG. 3E is a chart illustrating a normal operation model of a wind turbine for performance monitoring
Figure 3F:
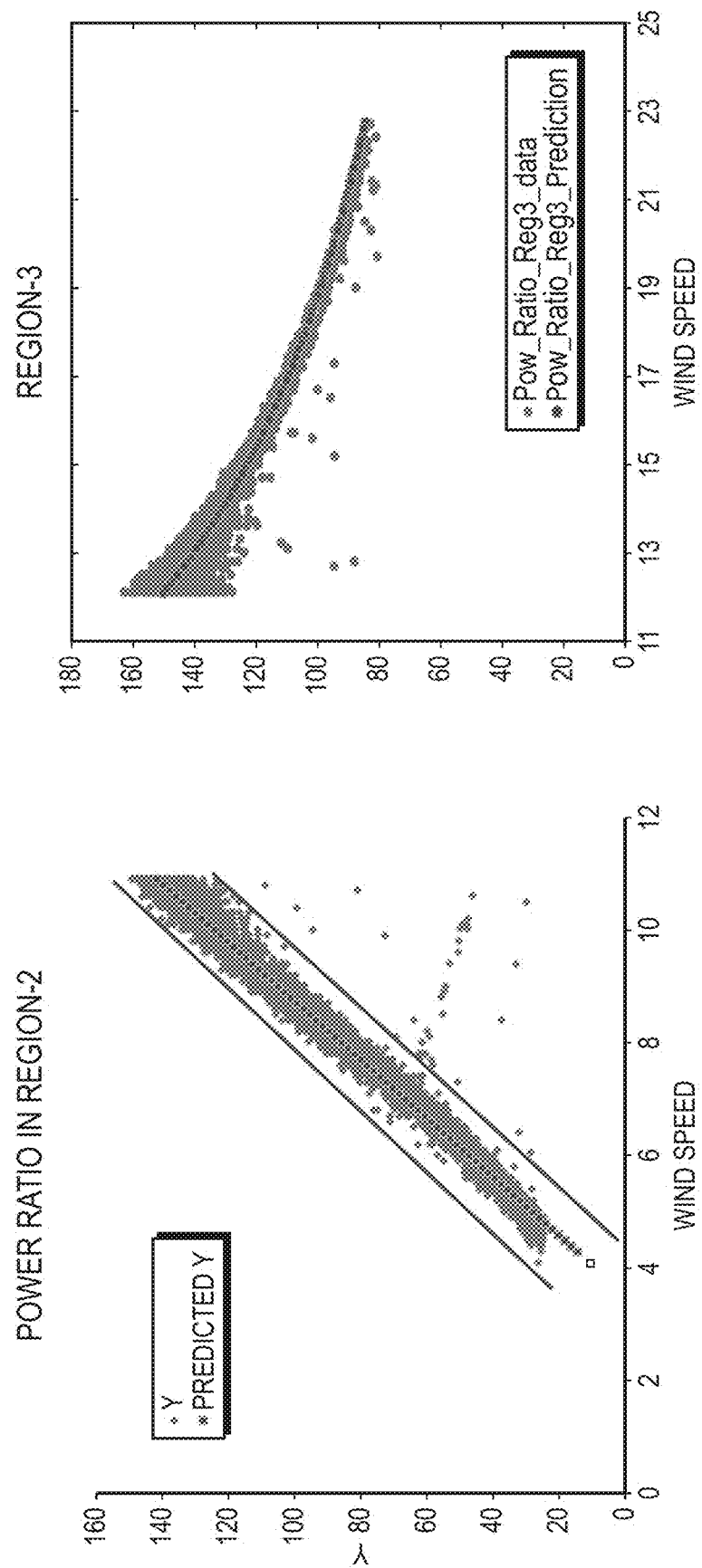
FIG. 3F is a chart illustrating model validation with SCADA data from one year of operation.

As show in FIG. 3C, a processor 310 may receive wind turbine SCADA data and using machine learning, separate the data into "normal data" and "anomaly data." The normal data may be used as baseline normal operation models 320, which in turn can be used for monitoring 325. The anomaly data may also be clustered to form anomaly groups 330, which when analyzed, can be used for anomaly diagnosis 335. In deploying embodiments of the invention on-line to monitor real-time SCADA data, both the normal data and anomaly data may be used to detect 340 particular anomalous events, and provide some prescriptive early-action recommendations.

Figure 4F:
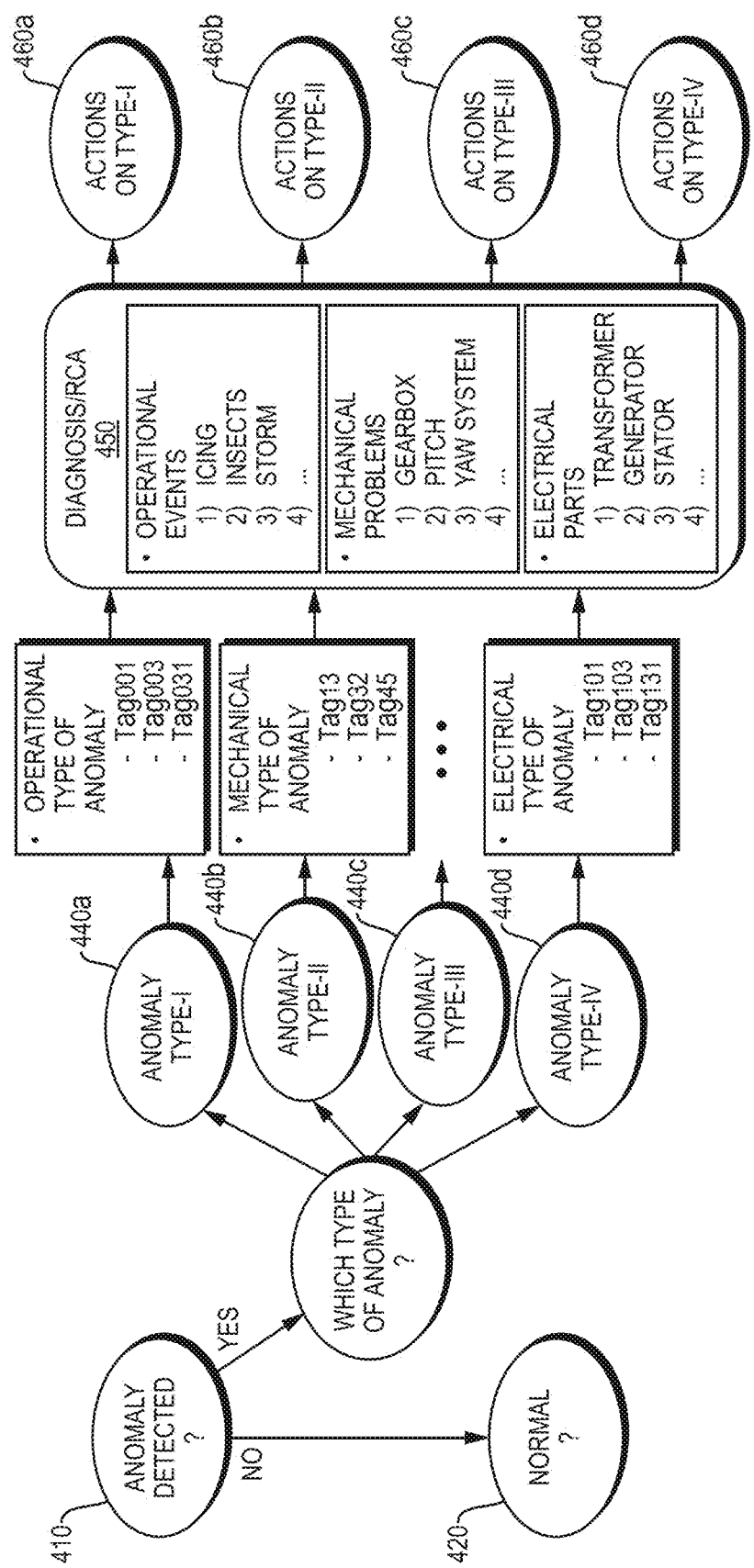
FIG. 4F is a chart illustrating anomaly classification and prescriptive guidance

FIG. 4F illustrates an example workflow diagram of method 250 deployed online. Working together with an online deployed normal operation model, the method 250 will assist users to first determine whether some sort of anomaly has been detected at step 410. The outcome can be "No" and that the data indicates normal operation 420. If, however, there is some form of anomaly, the method then identifies the type of anomaly at 430, and then calculates one or more KPI signatures for matching categories of the anomaly belongs 440*a-d*. The system can then diagnosis and perform a root cause analysis at 450 to further analyze the specific type of anomaly. For a specific type of known anomaly (e.g. mechanical, electrical, or operational) further signature match and diagnostic analysis is enabled and corresponding prescriptive guidance can be provided 460*a-d*. With timely alert notification and prescriptive action guidance provided by the system and methods, the wind farm practitioners can monitor and maintain their wind farm with high yield, low cost and reliable, safe, sustained operations.

Computer Support

Figure 5:
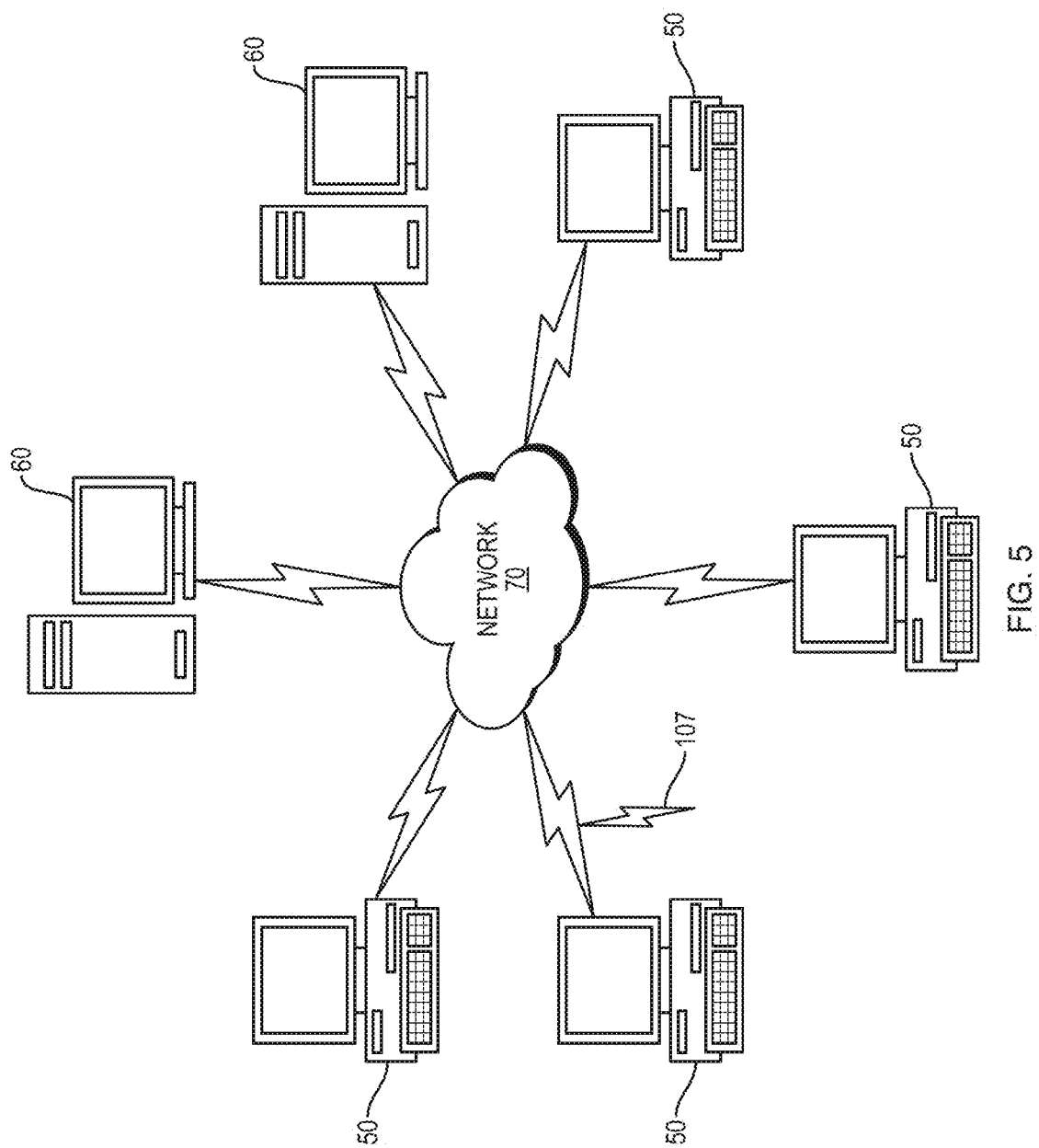
FIG. 5 is a schematic view of a computer network in which embodiments may be implemented.

FIG. 5 illustrates a computer network or similar digital processing environment in which wind turbine normal model process 240 and analytics deployment 250 and on-line deployment systems 200 embodying the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), cloud computing servers or service, a worldwide collection of computers, Local area or Wide area networks, and gateways that currently use respective protocols (TCP/IP, Bluetooth, etc.) to communicate with one another. Other electronic device/computer network architectures are suitable.

FIG. 6 is a diagram of the internal structure of a computer (e.g., client processor/device 50 or server computers 60) in the computer system of FIG. 4. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 5). Memory 90 provides volatile storage for computer software instructions 92 and data 94 used to implement an embodiment of the present invention. Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

In other embodiments, the program product 92 may be implemented as a so called Software as a Service (SaaS), or other installation or communication supporting end-users.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method for monitoring wind turbine for anomalous operation, the method comprising:
generating a historical operational dataset by loading historical operational SCADA data of at least one wind turbine, the historical operational dataset containing a plurality of sensor measurements over time, each sensor measurement associated with an engineering tag and at least one component of the at least one wind turbine;
creating one or more performance indicators corresponding to one or more sensor measurements;
applying at least one data clustering algorithm onto the dataset to identify and label normal operation data clusters;
building a normal operation model using the identified normal operation data clusters, the normal operation model defining a linear relationship between the one or more performance indicators and an Efficiency of Wind-To-Power (EWTP) ratio during normal operation of the at least one wind turbine, the defined linear relationship being a simplification of a non-linear relationship between wind speed and power;
defining a statistical confidence range around the defined linear relationship as criterion for monitoring of wind turbine performance;
receiving, by a computer system, real-time SCADA data related to the operation of the at least one wind turbine;
detecting an anomalous event based on measurements of the real-time SCADA data relative to the criterion; and
issuing an alert notification and prescriptive early-action recommendations.

2. The method of claim 1 wherein the at least one data clustering algorithm includes one of Density-Based Spatial Clustering of Applications with Noise (DBSCAN), Local Outlier Factor (LOF) clustering, or K-Means clustering.

3. The method of claim 1 wherein the Efficiency of Wind-To-Power (EWTP) ratio is defined as the ratio of output (electrical) power produced from a wind turbine to a wind speed feeding into the wind turbine.

4. The method of claim 1 wherein applying at least one data clustering algorithm further includes identifying a normal operation data cluster from a highest density of data clusters.

5. The method of claim 4 wherein building the normal operation model further includes splitting the normal operation data clusters into two sub-datasets according to the wind speed measurement values.

6. The method of claim 5 wherein splitting the normal operation dataset into two sub-datasets further includes partitioning each normal operation sub-datasets with a selected ratio, one portion setting for model training, and the other portion for model testing.

7. The method of claim 1 wherein building the normal operation model further includes calculating regressions of two separate linearized models, with EWTP as a model output, and wind speed as a model input, on training data covering two operation ranges of the at least one wind turbine.

8. The method of claim 1 wherein defining the statistical confidence range further includes calculating 3-sigma upper and lower envelope boundaries around the normal operation model.

9. The method of claim 1 wherein detecting an anomalous event based on measurements of the real-time SCADA data relative to the statistical confidence range further including identifying the anomalous event by matching the detected anomalous event to one or more class of previous known anomalous events.

10. The method of claim 9 wherein matching the detected anomalous event to one or more known anomalous events further including identifying events associated with a specific operational, mechanical, or electrical failure.

11. The method of claim 1 wherein issuing the alert notification and prescriptive early-action recommendations further including finding corresponding action recommendations from previous maintenance recordings, working logs and failure remediation.

12. The method of claim 1 further comprising adapting the normal operation model with new received data if the normal operation model is degraded or transferred to another wind turbine.

13. The method of claim 12 where adapting the normal operation model further includes:
periodically monitoring the real-time SCADA data to analyze wind turbine operation performance; and
updating the normal operation model based on the analysis of the wind turbine operation performance.

14. The method of claim 1 further comprising assessing severity of the detected anomalous event with estimations of current stage as well as model predictions on a foresight failure.

15. A system for monitoring wind turbine for anomalous operation, the system comprising:
an interface; and
a processor configured to
i. generate a historic operational dataset by loading historical operational SCADA data of at least one wind turbine, the historical operational dataset containing a plurality of sensor measurements over time, each sensor measurement associated with an engineering tag and at least one component of the at least one wind turbine;
ii. create at least one or more performance indicators corresponding to one or more sensor measurements;
iii. apply at least one data clustering algorithm onto the dataset to identify and label normal operation data clusters;
iv. build a normal operation model using the identified normal operation data clusters, the normal operation model defining a linear relationship between the one or more performance indicators and an Efficiency of Wind-To-Power (EWTP) ratio during normal operation of the at least one wind turbine, the defined linear relationship being a simplification of a non-linear relationship between wind speed and power;
v. define a statistical confidence range around the normal operation model as criterion for monitoring of wind turbine performance;
vi. receive real-time SCADA data related to the operation of the at least one wind turbine;
vii. detect an anomalous event based on measurements of the real-time SCADA data relative to the criterion; and
viii. if an anomalous event is detected, send a signal to the interface providing an alert notification and prescriptive early-action recommendation.

16. The system of claim 15 wherein the at least one data clustering algorithm includes one of Density-Based Spatial Clustering of Applications with Noise (DBSCAN), Local Outlier Factor (LOF) clustering, or K-Means clustering.

17. The system of claim 15 wherein the EWTP ratio is defined as the ratio of output (electrical) power produced from a wind turbine to a wind speed feeding into the wind turbine.

18. The system of claim 15 wherein the processor is configured to build the normal operation model by further identifying and labeling a normal operation data from a highest density of data clusters.

19. The system of claim 18 wherein the processor is configured to build the normal operation model by splitting the normal operation data clusters into two sub-datasets according to the wind speed measurement values.

20. The system of claim 19 wherein splitting the normal operation data clusters into two sub-datasets further includes partitioning the sub-datasets with a selected ratio, one portion setting for model training, and the other portion for model testing.

21. The system of claim 15 wherein the processor is further configured to build the normal operation model by calculating regressions of two separate linearized models on training data covering two operation ranges of the at least one wind turbine.

22. The system of claim 15 wherein the processor is further configured to define the statistical confidence range by calculating 3-sigma upper and lower envelope boundaries around the normal operation model.

23. The system of claim 15 wherein the processor is further configured to detect the anomalous event by matching the detected anomalous event to one or more class of previous known anomalous events.

24. The system of claim 23 wherein matching the detected anomalous event to one or more known anomalous events further includes identifying events associated with a specific operational, mechanical, or electrical failure.

25. The system of claim 15 wherein the processor is further configured to send a signal to the interface providing corresponding action recommendations from previous maintenance recordings, working logs and failure remediation.

26. The system of claim 15 wherein the processor is further configured to adapt the normal operation model with new received data if the normal operation model is degraded or transferred to another wind turbine.

27. The system of claim 26 where the processor if further configured to adapt the normal operation model by:
periodically monitoring the real-time SCADA data to analyze wind turbine operation performance; and
updating the normal operation model based on the analysis of the wind turbine operation performance.

28. The system of claim 15 wherein the processor is further configured to assess severity of the detected anomalous event with estimations of current stage as well as model prediction on a foresight failure.

* * * * *

UNITED STATES PATENT AND TRADEMARK OFFICE
CERTIFICATE OF CORRECTION

| | |
|---|---|
| PATENT NO. | : 11,761,427 B2 |
| APPLICATION NO. | : 17/362681 |
| DATED | : September 19, 2023 |
| INVENTOR(S) | : Hong Zhao et al. |

It is certified that error appears in the above-identified patent and that said Letters Patent is hereby corrected as shown below:

In the Claims

In Column 16, Claim 9, Line 60, delete "an" before "anomalous" and insert -- the --.

Signed and Sealed this
Fourteenth Day of November, 2023

*Katherine Kelly Vidal*

Katherine Kelly Vidal
*Director of the United States Patent and Trademark Office*